United States Patent
Sakamoto et al.

(10) Patent No.: US 11,615,633 B2
(45) Date of Patent: Mar. 28, 2023

(54) MONITORING DEVICE, MONITORING SYSTEM, AND MONITORING METHOD

(71) Applicant: Panasonic Intellectual Property Management Co., Ltd., Osaka (JP)

(72) Inventors: Teruo Sakamoto, Tokyo (JP); Yoshimasa Okabe, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 15 days.

(21) Appl. No.: 17/327,075

(22) Filed: May 21, 2021

(65) Prior Publication Data
US 2022/0374640 A1 Nov. 24, 2022

(51) Int. Cl.
*G06V 20/59* (2022.01)
*G06T 7/10* (2017.01)
*B60W 50/14* (2020.01)
*G06V 20/56* (2022.01)

(52) U.S. Cl.
CPC .......... *G06V 20/597* (2022.01); *B60W 50/14* (2013.01); *G06T 7/10* (2017.01); *G06V 20/588* (2022.01); *B60R 2300/30* (2013.01); *B60R 2300/8006* (2013.01); *B60W 2050/143* (2013.01); *B60W 2050/146* (2013.01); *G06T 2207/30256* (2013.01); *G06T 2207/30268* (2013.01)

(58) Field of Classification Search
CPC ... G06V 20/597; G06V 20/588; B60W 50/14; B60W 2050/143; B60W 2050/146; G06T 7/10; G06T 2207/30256; G06T 2207/30268; B60R 2300/30; B60R 2300/8006

See application file for complete search history.

(56) References Cited

U.S. PATENT DOCUMENTS

| 8,421,863 | B2 | 4/2013 | Yumiba et al. |
| 9,648,288 | B2 * | 5/2017 | Kondo ................ G01R 31/382 |
| 2011/0025848 | A1 * | 2/2011 | Yu ............................ B60R 1/00 348/148 |
| 2012/0002050 | A1 | 1/2012 | Taniguchi et al. |
| 2017/0282796 | A1 * | 10/2017 | Kosaki ................ G06V 20/597 |

(Continued)

FOREIGN PATENT DOCUMENTS

| JP | 2011-025874 | 2/2011 |
| JP | 2012-011849 | 1/2012 |
| JP | 2020-164003 | 10/2020 |

OTHER PUBLICATIONS

Office Action from Japan Patent Office (JPO) in Japanese Patent Appl. No. 2019-066057, dated Oct. 4, 2022, together with a partial English language translation.

*Primary Examiner* — Mohamed Barakat
(74) *Attorney, Agent, or Firm* — Greenblum & Bernstein, P.L.C.

(57) ABSTRACT

A monitoring device receives an image captured by an image capturing device mounted on a vehicle. The monitoring device performs a monitoring process for a preset monitoring range based on the captured image received from the image capturing unit. The monitoring device displays a plurality of menus indicating different monitoring ranges on a display device, and sets a monitoring range corresponding to a menu selected by the user from the plurality of menus as the monitoring range in the monitoring process.

14 Claims, 20 Drawing Sheets

(56) References Cited

U.S. PATENT DOCUMENTS

2018/0050639 A1* 2/2018 Eberhard ............... G06F 3/013
2020/0167948 A1* 5/2020 Shimmoto ........... G06V 40/161
2020/0290606 A1* 9/2020 Watanabe .............. G08G 1/166

* cited by examiner

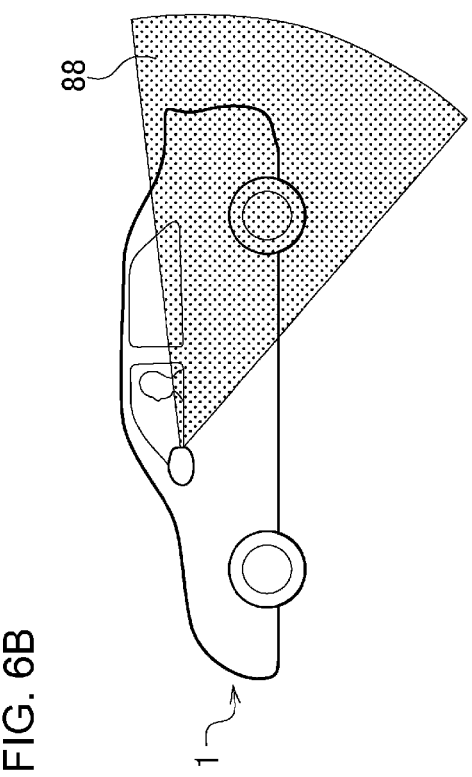
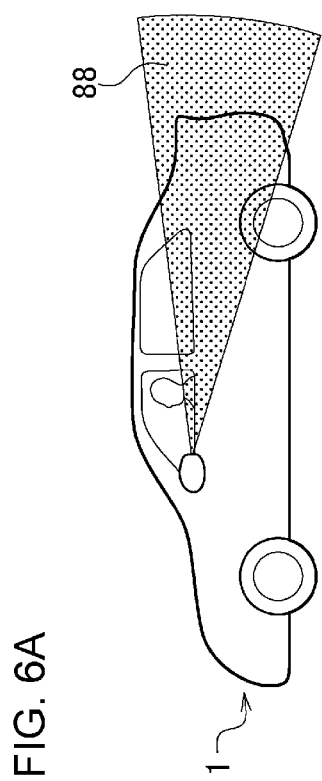

FIG. 14

| MENU SELECTION IN NORMAL MODE | FIELD OF VIEW RANGE SETTING IN BLINKER-LINKED MODE |
|---|---|
| HIGH MAGNIFICATION (MINIMUM FIELD OF VIEW) | GOOD BALANCE (MEDIUM FIELD OF VIEW) |
| GOOD BALANCE (MEDIUM FIELD OF VIEW) | WIDE FIELD OF VIEW (MAXIMUM FIELD OF VIEW) |
| WIDE FIELD OF VIEW (MAXIMUM FIELD OF VIEW) | WIDE FIELD OF VIEW (MAXIMUM FIELD OF VIEW) |

FIG. 15

| MENU SELECTION IN NORMAL MODE | FIELD OF VIEW RANGE SETTING IN REVERSE GEAR-LINKED MODE |
|---|---|
| HIGH MAGNIFICATION (MINIMUM FIELD OF VIEW) | EXPAND FIELD OF VIEW TO GROUND CONTACT POSITION OF REAR WHEELS (MEDIUM FIELD OF VIEW) |
| GOOD BALANCE (MEDIUM FIELD OF VIEW) | EXPAND FIELD OF VIEW TO FRONT OF REAR WHEELS (MAXIMUM FIELD OF VIEW) |
| WIDE FIELD OF VIEW (MAXIMUM FIELD OF VIEW) | EXPAND FIELD OF VIEW TO FRONT OF REAR WHEELS (MAXIMUM FIELD OF VIEW) |

MONITORING DEVICE, MONITORING SYSTEM, AND MONITORING METHOD

BACKGROUND ART

1. Field

The present disclosure relates to data processing technology and particularly to a monitoring device, a monitoring system, and a monitoring method.

2. Description of the Related Art

A camera monitoring system that acquires an image captured by a vehicle interior camera and generates a surrounding image of the driver's vehicle based on the image may be mounted on the vehicle.

[Patent Literature 1] Japanese Unexamined Patent Application Publication No. 2011-25874

When setting the monitoring range (in other words, the field of view range) of a camera monitoring system, there are various items to be adjusted, and it may not be easy to set the monitoring range.

SUMMARY

In this background, a purpose of the present disclosure is to facilitate the setting of the monitoring range of a camera monitoring system.

A monitoring device according to one embodiment of the present disclosure includes: a receiving unit that receives an image captured by an image capturing device mounted on a vehicle; a monitoring processing unit that performs a monitoring process for a preset monitoring range based on the captured image received by the receiving unit; and a setting processing unit that sets the monitoring range of the monitoring processing unit. The setting processing unit displays a menu screen including a plurality of menus indicating different monitoring ranges on a display device, and sets a monitoring range corresponding to a menu selected by the user from the plurality of menus as the monitoring range of the monitoring processing unit.

Another embodiment of the present disclosure relates to a monitoring system. This monitoring system includes: an image capturing device that is mounted on a vehicle; a display device that is mounted on the vehicle; and a monitoring device that is mounted on the vehicle. The monitoring device includes: a receiving unit that receives an image captured by an image capturing device mounted on a vehicle; a monitoring processing unit that performs a monitoring process for a preset monitoring range based on the captured image received by the receiving unit; and a setting processing unit that sets the monitoring range of the monitoring processing unit. The setting processing unit displays a menu screen including a plurality of menus indicating different monitoring ranges on a display device, and sets a monitoring range corresponding to a menu selected by the user from the plurality of menus as the monitoring range of the monitoring processing unit.

Still another embodiment of the present disclosure relates to a vehicle. This vehicle includes: an image capturing device; a display device; and a monitoring device. The monitoring device includes: a receiving unit that receives an image captured by an image capturing device mounted on a vehicle; a monitoring processing unit that performs a monitoring process for a preset monitoring range based on the captured image received by the receiving unit; and a setting processing unit that sets the monitoring range of the monitoring processing unit. The setting processing unit displays a menu screen including a plurality of menus indicating different monitoring ranges on a display device, and sets a monitoring range corresponding to a menu selected by the user from the plurality of menus as the monitoring range of the monitoring processing unit.

Still another embodiment of the present disclosure relates to a monitoring method. This method is implemented by a computer mounted on a vehicle and includes: receiving an image captured by an image capturing device mounted on the vehicle; performing a monitoring process for a preset monitoring range based on the captured image; and displaying a menu screen including a plurality of menus indicating different monitoring ranges on a display device, and setting a monitoring range corresponding to a menu selected by the user from the plurality of menus as the monitoring range in the monitoring process.

Optional combinations of the aforementioned constituting elements, and implementations of the disclosure in the form of computer programs, recording mediums encoded with computer programs, etc., may also be practiced as additional modes of the present disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 6A is a side view showing a side-rear field of view range in a normal traveling state, and FIG. 6B is a side view showing a side-rear field of view range when a reverse gear is operated;

FIG. 14 is a diagram showing an example of batch setting of a plurality of monitoring ranges;

FIG. 15 is a diagram showing an example of batch setting of a plurality of monitoring ranges;

DETAILED DESCRIPTION

The invention will now be described by reference to the preferred embodiments. This does not intend to limit the scope of the present invention, but to exemplify the invention.

Figure 1:
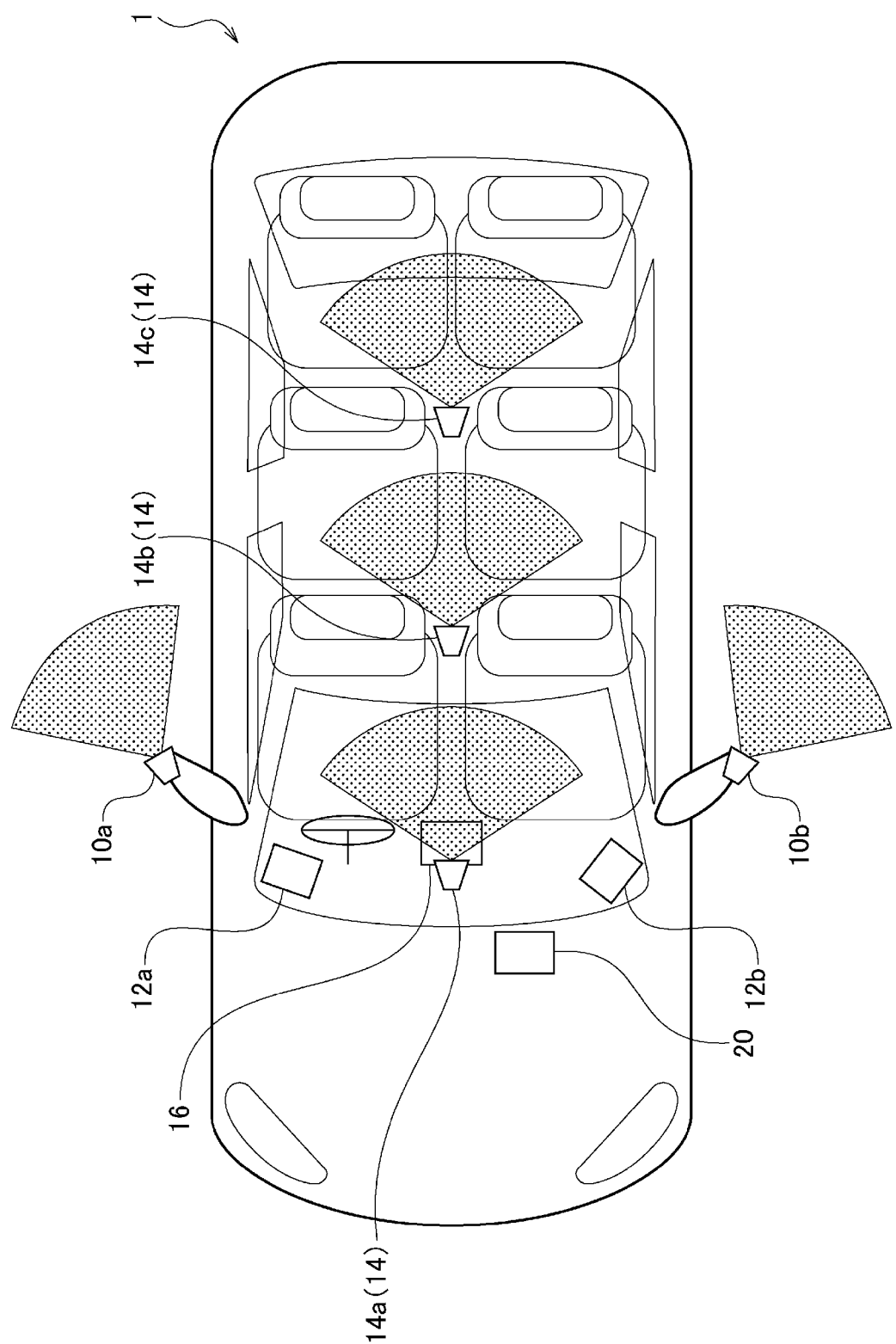
FIG. 1 is a plan view schematically showing a vehicle according to an exemplary embodiment.

FIG. 1 is a plan view schematically showing a vehicle according to an exemplary embodiment. A vehicle 1 includes a right camera 10a, a left camera 10b, a right display 12a, a left display 12b, a vehicle interior camera 14a, a vehicle interior camera 14b, a vehicle interior camera 14c (hereinafter collectively referred to as vehicle interior cameras 14), a touch panel 16, and a monitoring device 20. In FIG. 1, the field of view of each camera is indicated by a fan-shaped object. Further, the vehicle 1 further includes a speaker (not shown).

The right camera 10a images a space behind the right side of the vehicle 1, and the right display 12a displays an image captured by the right camera 10a. The left camera 10b images a space behind the left side of the vehicle 1, and the left display 12b displays an image captured by the left camera 10b. The vehicle interior camera 14a images the vicinity of the first row seat in the vehicle interior, the vehicle interior camera 14b images the vicinity of the second row seat in the vehicle interior, and the vehicle interior camera 14c images the vicinity of the third row seat in the vehicle interior.

The touch panel 16 is a versatile touch panel display. The touch panel 16 according to the exemplary embodiment also functions as an operation unit that receives an occupant's operation, a display for monitoring the interior of the vehicle, and a display for displaying a setting screen. The monitoring device 20 is an information processing device that controls vehicle surroundings monitoring and vehicle interior monitoring. The monitoring device 20 may be mounted as an electronic control unit (ECU).

Figure 2:
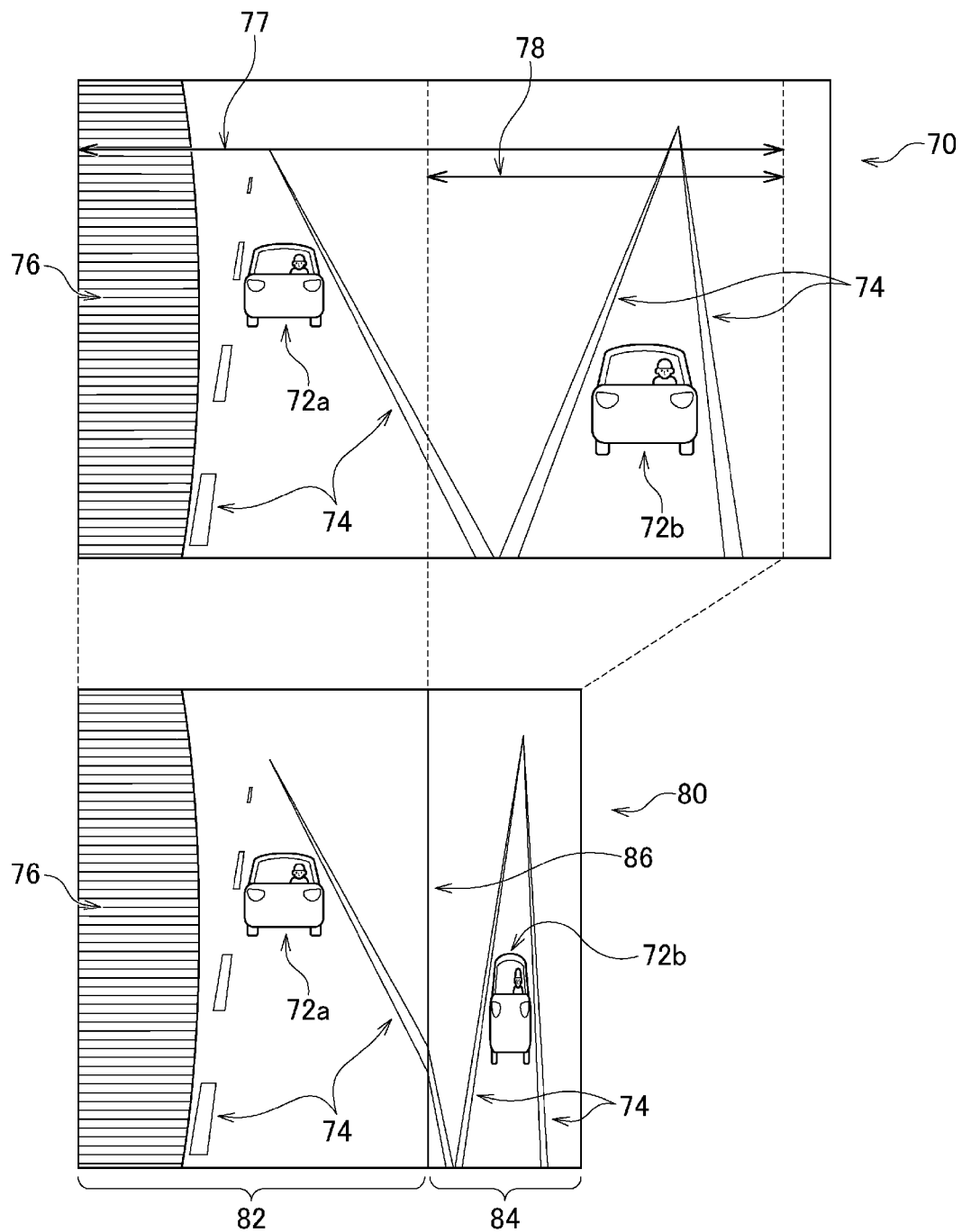
FIG. 2 is a diagram showing an example of a captured image and a display image.

FIG. 2 shows an example of a captured image and a display image. A captured image 70 in the figure shows an image (or one frame of a video image) captured by the left camera 10b in FIG. 1, and a display image 80 shows an image displayed on the left display 12b in FIG. 1.

The captured image 70 shows a condition on the rear side of the vehicle 1 (diagonally to the back left in the figure). The captured image 70 includes at least one of an image of another vehicle (for example, another vehicle 72a and another vehicle 72b), an image of a pedestrian, an image of a road sign, and an image of a road marking (for example, a lane dividing line 74). The other vehicle 72a in FIG. 2 represents an image of another vehicle traveling in a lane adjacent to a lane in which the vehicle 1 is traveling, and the other vehicle 72b represents an image of another vehicle traveling in another lane that joins the lane in which the vehicle 1 is traveling. Further, the captured image 70 also shows a driver's vehicle body 76, which represents an image of the left side surface of the vehicle body of the vehicle 1.

In a setting mode described later, a field of view range 77, which is a range in the captured image 70 that is to be included in the display image 80, and a reduction range 78, which is the target of reduction in the captured image 70, are set. The monitoring device 20 reduces (in other words, compresses) a portion of the field of view range 77 of the captured image 70 that corresponds to the reduction range 78 in the horizontal direction by a known method.

The display image 80 includes a same-magnification image 82 and a reduced image 84. The same-magnification image 82 is an image of a region of the field of view range 77 of the captured image 70 excluding the reduction range 78, and is an image displayed at the same magnification without being reduced. The reduced image 84 is an image of a region corresponding to the reduction range 78 of the captured image 70, and is an image obtained by horizontally reducing the reduction range 78 of the captured image 70. The reduced image 84 shows the other vehicle 72b and the lane dividing line 74 shown in the reduction range 78 of the captured image 70 in a horizontally compressed manner. The monitoring device 20 generates a display image 80 in which the image of the field of view range 77 of the captured image 70 is set, and includes the reduced image 84 obtained by reducing the image of the reduction range 78 of the captured image 70.

The monitoring device 20 includes a monitoring mode and a setting mode as operation states. The monitoring mode represents an operation state in which a monitoring process (display of the display image 80, etc.) is performed based on images captured by various cameras. On the other hand, the setting mode represents an operation state for setting and adjusting a monitoring range according to the monitoring device 20, in other words, the field of view range shown in the display image 80, the reduction range, and the like. It is dangerous to adjust the monitoring range according to the monitoring device 20 on a roadway on which the vehicle actually travels. On the other hand, when the adjustment is made in a garage or the like, it is hard for the driver (hereinafter, also referred to as "user") to tell how the surroundings of the vehicle are shown in the display image 80 as a result of the adjustment.

Therefore, the monitoring device 20 displays virtual following vehicles and lanes by computer graphics (hereinafter referred to as "CG") in the setting mode. Thereby, the driver can check changes in the way the view looks due to the adjustment as a simulation by CG that is independent of a place where the adjustment work is actually performed. In other words, the presentation of the way the display image 80 looks in accordance with the adjustment of the monitoring range by the driver to the driver by CG synthesis allows the driver to grasp the way the adjusted display image 80 looks even when the adjustment work is performed in a garage or the like.

Figure 3:
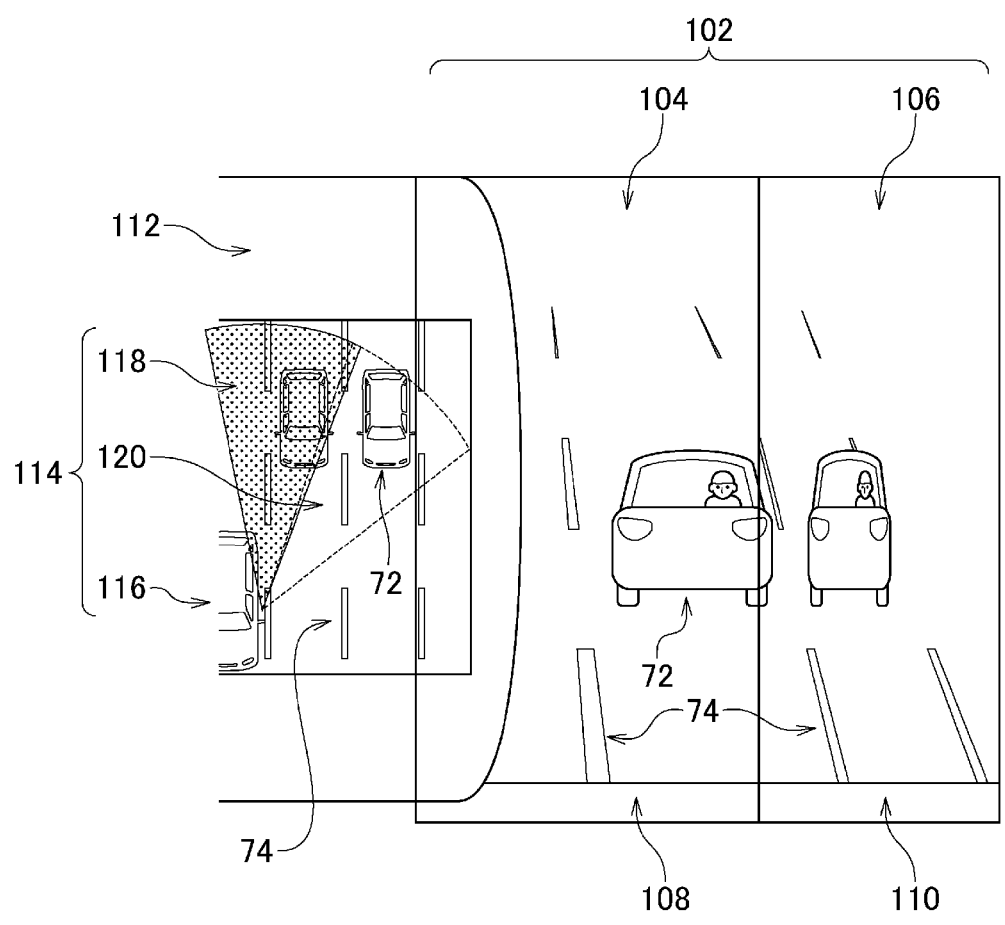
FIG. 3 is a diagram showing an example of an adjustment screen.

More specifically, the monitoring device 20 displays an adjustment screen for adjusting the field of view range of the display image 80 on the touch panel 16 in the setting mode. FIG. 3 shows an example of the adjustment screen. The adjustment screen includes an alternative image that looks like the monitoring range according to the monitoring device 20 (in other words, the field of view range of the display image 80). The alternative image according to the exemplary embodiment includes CG, which is an artificially synthesized image. Further, similarly to the captured image 70 and the display image 80, the alternative image includes an image of another vehicle, an image of a pedestrian, and an image of a road sign or an image of a road marking. The alternative image may be an image previously captured by a camera instead of CG.

An adjustment screen 100 includes a bird's-eye view CG 114, which is computer graphics (CG) including a bird's-eye view for allowing the user to set the field of view range of the display image 80. Further, the adjustment screen 100 is an image corresponding to the above-mentioned alternative image, and includes a rear view CG102 corresponding to the setting state of the bird's-eye view CG114. The rear view CG 102 is a CG showing the content of the display image 80 assumed based on the field of view range set by the driver with respect to the bird's-eye view CG 114. Further, the adjustment screen 100 is a CG showing the vehicle body of the vehicle 1, and includes a driver's vehicle CG 112 corresponding to the driver's vehicle body 76 in the display image 80.

The rear view CG102 in FIG. 3 shows the state of the left rear side of the vehicle 1, and includes the lane dividing line 74 and another vehicle 72 on the lane. Further, the bird's-eye view CG114 shows a state in which the left rear side of the vehicle 1 is viewed from above, and includes the lane dividing line 74 and the other vehicle 72 on the lane. As a result, it is possible to support the setting of an appropriate field of view range even when the adjustment is made in a garage where other vehicles or lane dividing lines are not captured by an image capturing device.

The bird's-eye view CG114 includes a driver's vehicle indicator 116, a same-size range indicator 118, and a reduction range indicator 120. The driver's vehicle indicator 116 is a CG showing an image of the vehicle 1 viewed from above. Alternatively, the driver's vehicle indicator 116 may be a photographic image stored in advance. The same-size range indicator 118 is a fan-shaped image that shows a bird's-eye view of a range that is in the range included in the display image 80 (that is, the field of view range) and that is not reduced and is displayed at the same magnification. The reduction range indicator 120 is a fan-shaped image that is in the range included in the display image 80 and that shows a bird's-eye view of a range to be reduced and displayed. Different appearances (different patterns, colors, etc.) are set for the same-size range indicator 118 and the reduction range indicator 120.

The rear view CG 102 includes a same-size region CG 104 and a reduced region CG 106. The same-size region CG 104 is a CG that shows the state around the vehicle 1 (the rear space on the left side in the figure) specified by the same-size range indicator 118 at the same magnification without reduction. In other words, the same-size region CG 104 is a CG that shows the state around the vehicle 1 corresponding to the range indicated by the same-size range indicator 118 in the same size as an image captured by the image capturing device.

The reduced region CG 106 is a CG that reduces and displays the state around the vehicle 1 (a rear space on the left side in the figure) specified by the reduction range indicator 120. In other words, the reduced region CG 106 is a CG that indicates the state around the vehicle 1 corresponding to the range indicated by the reduction range indicator 120 in a size smaller than that displayed in the captured image. In the reduced region CG 106, the other vehicle 72 is compressed in the horizontal direction, in other words, the width of the other vehicle 72 is reduced. Further, in the reduced region CG 106, the lanes are compressed in the horizontal direction, in other words, the distance between the lane dividing lines 74 in the horizontal direction is reduced.

To the rear view CG 102, a same-size region indicator 108, which is an object indicating the range of a reduced image, and a reduced region indicator 110, which is an object indicating the range of an image that is not reduced, are added. More specifically, the same-size region indicator 108 is added to a lower position of the same-size region CG 104, and the reduced region indicator 110 having a different aspect (pattern, color, etc.) from the same-size region indicator 108 is added to a lower position of the reduced region CG 106.

The same-size region indicator 108 is set to have the same appearance (pattern, color, etc.) as the same-size range indicator 118 of the bird's-eye view CG 114. Further, the reduced region indicator 110 is set to have the same appearance as the reduction range indicator 120 of the bird's-eye view CG 114. This makes it easier for the driver to intuitively recognize that the same-size range indicator 118 and the same-size region CG 104 correspond to each other and that the reduction range indicator 120 and the reduced region CG 106 correspond to each other.

Figure 4:
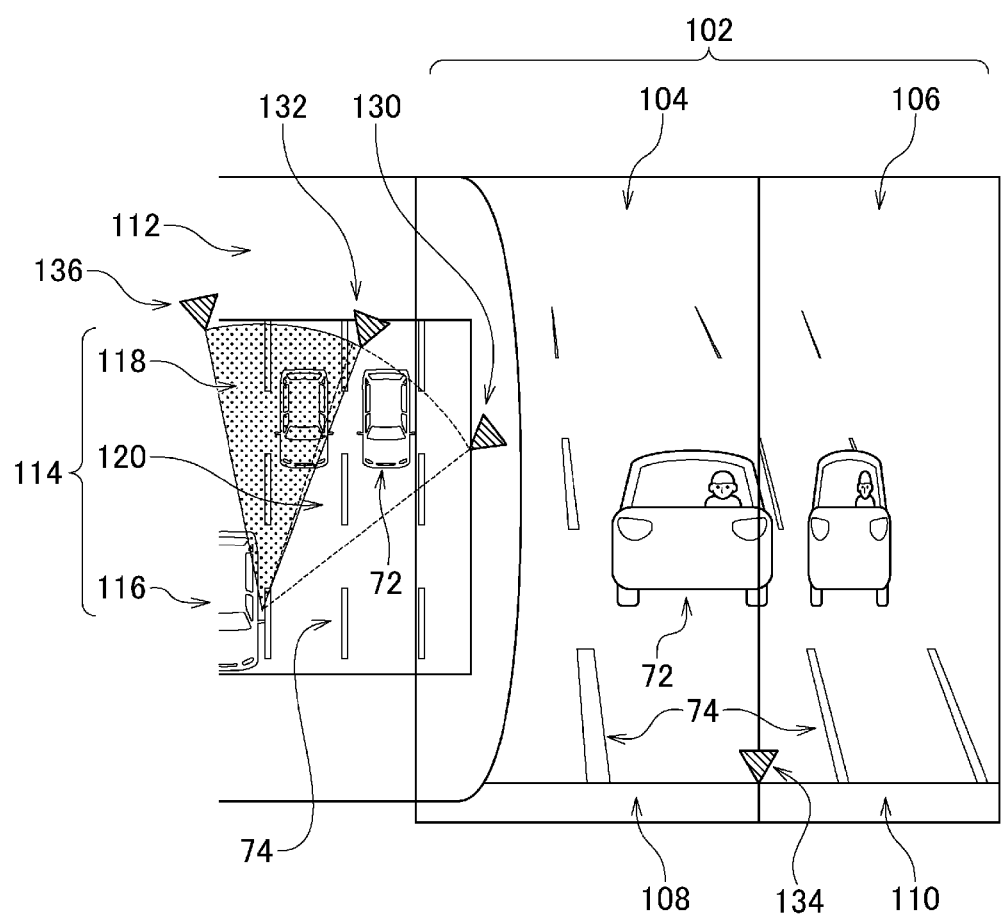
FIG. 4 is a diagram showing setting items on the adjustment screen.

FIG. 4 shows setting items on the adjustment screen 100. The first setting item is an outer limit angle 130 of the entire displayed field of view. The second setting item is a compression boundary 132, which is the boundary between a range that is compressed and a range that is uncompressed. The third setting item is an uncompressed screen range 134, which is a range of the screen that is displayed at the same magnification without compression. The fourth setting item is an inner limit angle 136 of the entire displayed field of view. The fifth setting item is a reduction rate in the vertical direction.

As described, the setting items on the adjustment screen 100 are diverse, and the adjustment of a single setting item can significantly change the way the rear view CG 102 (that is, the display image 80) looks. Therefore, it may not be easy for the driver to make adjustment on the adjustment screen 100 so that the view looks in a desired way. In other words, since the adjustment screen 100 has a high degree of freedom in setting, there is a problem that the setting is rather troublesome.

Figure 5A:
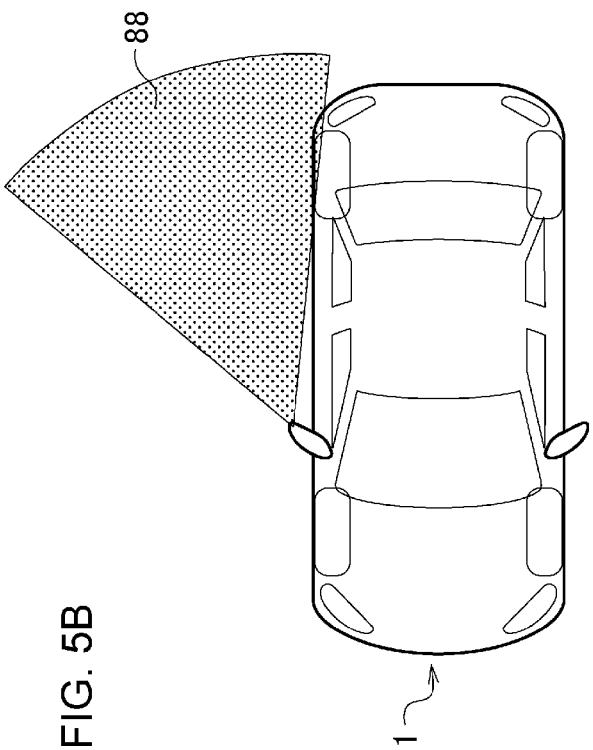
FIG. 5A is a plan view showing a side-rear field of view range in a normal traveling state.
Figure 5B:
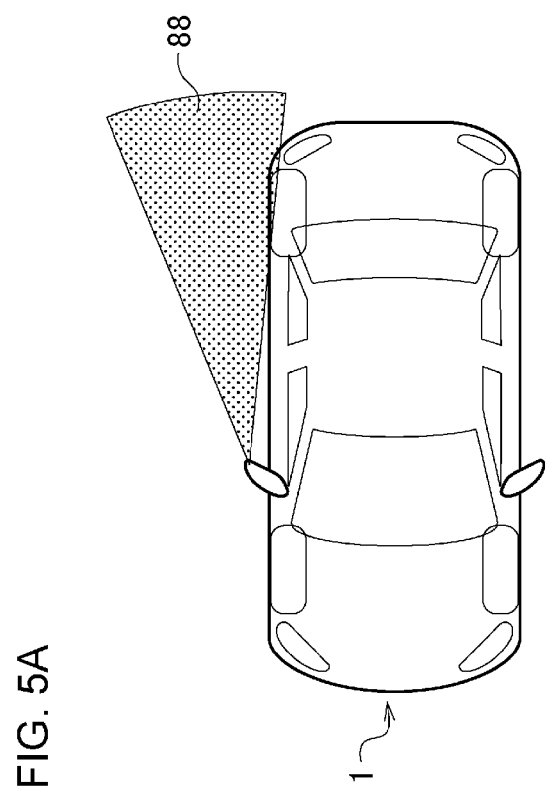
FIG. 5B is a plan view showing a side-rear field of view range when a blinker is operated.

FIG. 5A shows a field of view range (in other words, a monitoring range) in the horizontal direction under a normal traveling state, and FIG. 5B shows a field of view range in the horizontal direction when a blinker is operated. In this way, in the vehicle 1, the field of view range of a right camera 10a (or a left camera 10b) in the horizontal direction is expanded in linkage with the operation of the right blinker (or the left blinker). Further, FIG. 6A shows a field of view range in the vertical direction under a normal traveling state, and FIG. 6B shows a field of view range in the vertical direction when a reverse gear is operated. In this way, in the vehicle 1, the field of view of the right camera 10a and the left camera 10b in the vertical direction is expanded in linkage with the operation of the reverse gear.

As shown in FIGS. 5A, 5B, 6A, and 6B, in the vehicle 1, a plurality of field of view ranges are provided that correspond to a plurality of traveling states. If adjustment is required for each of the plurality of field of view ranges corresponding to the plurality of traveling states, the time and effort required for adjusting the field of view ranges may be doubled, which may be an excessive burden on the driver.

Further, as described later, a space around the vehicle 1 includes an area (hereinafter referred to as "regulation area") that is required to be displayed at a predetermined magnification or more due to a law or regulation (for example, UN Regulation UN-R46) or a safety requirement. Depending on the driver's adjustment, the regulation area may fall outside the field of view, which needs to be dealt with. Furthermore, when a plurality of people (married couples, etc.) share the vehicle 1, it is necessary to set the field of view range every time the driver changes if there is a difference in the preference in the field of view range, and this results in requiring time and effort.

In order to solve these problems, the monitoring system according to the exemplary embodiment allows a desired menu to be selected from a plurality of menus corresponding to a plurality of patterns such as a wide field of view, a high magnification, and a small amount of distortion so as to thereby achieve easy setting of the field of view. A detailed description thereof is given in the following.

Figure 7:
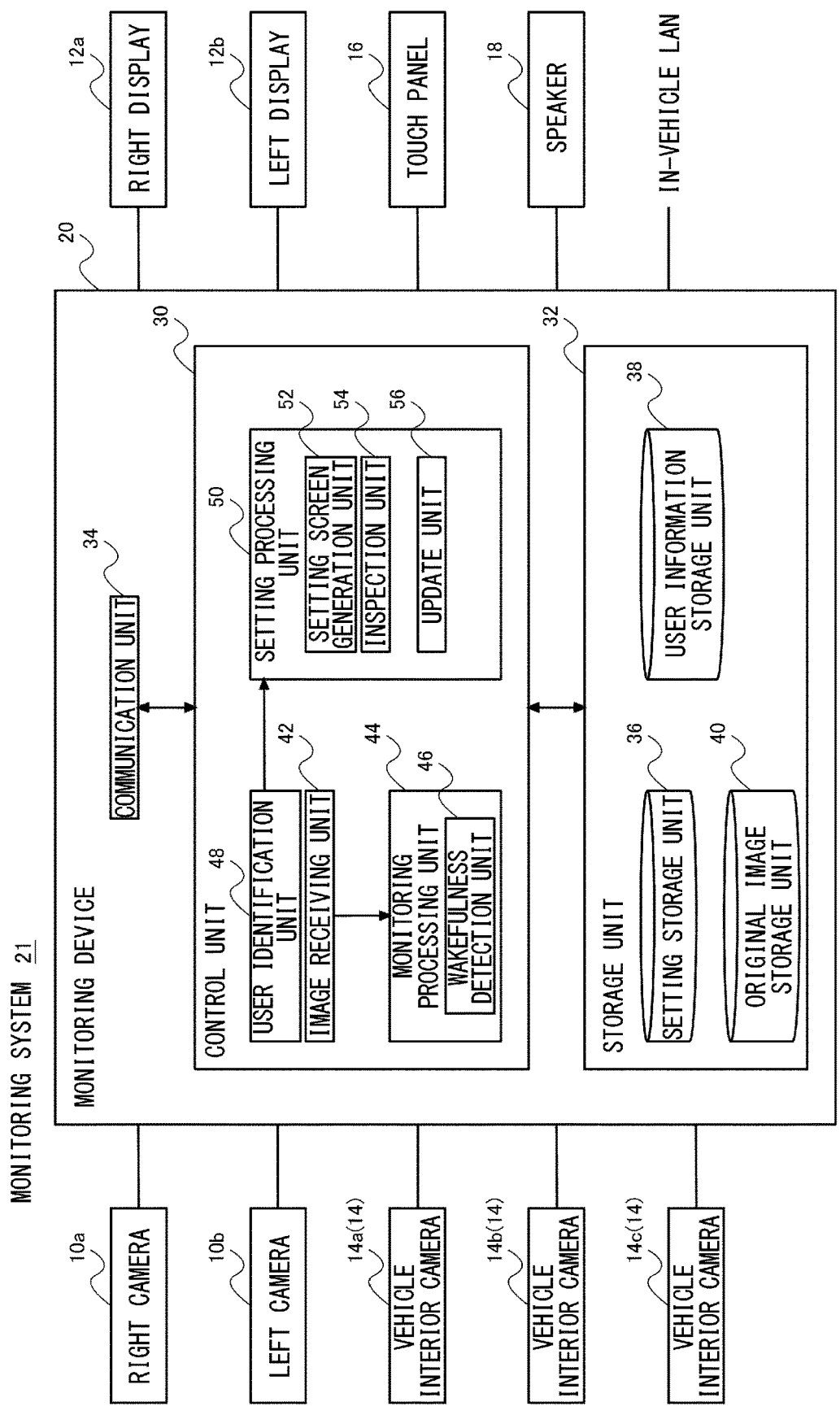
FIG. 7 is a block diagram showing functional blocks of a monitoring system according to the exemplary embodiment.

FIG. 7 is a block diagram showing functional blocks of the monitoring system according to the exemplary embodiment. A monitoring system 21 is an information processing system built in the vehicle 1 and can be considered as a camera monitoring system. The monitoring system 21 includes a right camera 10a, a left camera 10b, a right display 12a, a left display 12b, a vehicle interior camera 14a, a vehicle interior camera 14b, a vehicle interior camera 14c, a touch panel 16, a speaker 18, and a monitoring device 20. These devices are connected by Media Oriented Systems Transport (MOST), universal serial bus (USB), or the like.

The monitoring device 20 includes a control unit 30, a storage unit 32, and a communication unit 34. The control unit 30 executes various data processing related to monitoring and setting. The storage unit 32 stores data that is referenced or updated by the control unit 30. The communication unit 34 communicates with an external device according to a predetermined communication protocol. The communication unit 34 also serves as an interface with an in-vehicle LAN. The control unit 30 transmits/receives data to/from the external device via the communication unit 34.

The storage unit 32 includes a setting storage unit 36, a user information storage unit 38, and an original image storage unit 40. The setting storage unit 36 stores setting information that includes a monitoring range and a monitoring method for vehicle surroundings monitoring and a monitoring range and a monitoring method for vehicle interior monitoring and that is applied to a monitoring processing unit 44 described later. The setting information includes the outer limit angle and the inner limit angle of the entire field of view, the compression boundary, the uncompressed screen range, and the reduction rate in the vertical direction described in relation to FIG. 4.

The user information storage unit 38 stores identification information of one or more users (drivers) in association with setting information (including a monitoring range and a monitoring method) of each user. The original image storage unit 40 stores a CG image from which an image to be displayed on the setting screen is cut out. The original image includes an image of another vehicle, an image of a pedestrian, an image of a road sign, and an image of a road marking. The original image may be a photographed image previously captured by a camera instead of CG.

The control unit 30 includes an image receiving unit 42, a monitoring processing unit 44, a user identification unit 48, and a setting processing unit 50. A computer program including a plurality of modules corresponding to these multiple functional blocks may be installed in the storage unit 32 (ROM or the like) of the monitoring device 20. The CPU of the monitoring device 20 may exert the functions of the multiple functional blocks by reading the computer program into the RAM and running the computer program.

The image receiving unit 42 receives image data generated by the right camera 10a, the left camera 10b, the vehicle interior camera 14a, the vehicle interior camera 14b, and the vehicle interior camera 14c (in other words, each frame of a video image and is also called "captured image") from each camera.

In the monitoring mode, the monitoring processing unit 44 performs a monitoring process for a preset monitoring range based on a captured image received by the image receiving unit 42. In the exemplary embodiment, the monitoring processing unit 44 performs the monitoring process in accordance with the monitoring range and the monitoring method indicated by the setting information stored in the setting storage unit 36. The monitoring processing unit 44 causes the display image 80 as shown in FIG. 2 to be displayed on the right display 12a and the left display 12b. Further, the monitoring processing unit 44 causes the touch panel 16 to display an image captured by the vehicle interior camera 14.

The monitoring processing unit 44 includes a wakefulness detection unit 46. The wakefulness detection unit 46 detects the wakefulness degree of each occupant of the vehicle 1 based on images captured by the vehicle interior camera 14a, the vehicle interior camera 14b, and the vehicle interior camera 14c. The wakefulness detection unit 46 may detect the wakefulness degree of the occupant by a known method and may estimate the wakefulness degree of the occupant based on, for example, the state of the occupant's eyes shown in the captured images.

The user identification unit 48 identifies the individual driver at the time of starting the monitoring device 20 or changing the driver, and passes driver information including the identification result to the setting processing unit 50. The user identification unit 48 may further pass a flag indicating that the driver has changed to the setting processing unit 50.

For example, the user identification unit 48 may identify the driver based on the ID of a key used when the ignition of the vehicle 1 is turned on and output driver information including the ID as the driver's ID to the setting processing unit 50. Further, the user identification unit 48 may identify the driver by face recognition using the image captured by a vehicle interior camera 14. Further, the user identification unit 48 may identify the driver based on the seat position of the driver's seat. Further, the user identification unit 48 may identify the driver based on a weight detection result by a load cell.

In the setting mode, the setting processing unit 50 displays a plurality of menus indicating different monitoring ranges on the touch panel 16, and sets a monitoring range corresponding to a menu selected by the user from the plurality of menus as a monitoring range in the monitoring mode, in other words, as a display range according to the monitoring processing unit 44.

The setting processing unit 50 includes a setting screen generation unit 52, an inspection unit 54, and an update unit 56. The setting screen generation unit 52 generates data on a setting screen in which the plurality of menus indicating different monitoring ranges are arranged, and outputs data on the setting screen to the touch panel 16 for display. The inspection unit 54 determines whether or not a change in the monitoring range or monitoring method instructed through the user operation complies with the laws and regulations or the demand for safety.

The update unit 56 reads setting information associated with the driver information (for example, the driver's ID) output from the user identification unit 48 from the user information storage unit 38, and stores the read setting information in the setting storage unit 36. Thereby, the monitoring range and the monitoring method preset by the driver are reflected in the monitoring process performed by the monitoring processing unit 44.

That is, the user identification unit 48 and the update unit 56 cooperate with each other to set, as the monitoring range or monitoring method in the monitoring mode, a monitoring range or a monitoring method stored in advance in the user information storage unit 38 in association with the driver when the monitoring device 20 is activated or a driver change is detected. Thereby, the driver's trouble of manually resetting the monitoring range according to the monitoring device 20 every time the driver changes can be saved.

Further, the update unit 56 stores the details set by the driver (for example, the monitoring range and the monitoring method) on the setting screen in the setting storage unit 36. The update unit 56 also stores the above details in the user information storage unit 38 in association with the identification information of the driver identified by the user identification unit 48.

Figure 8A:
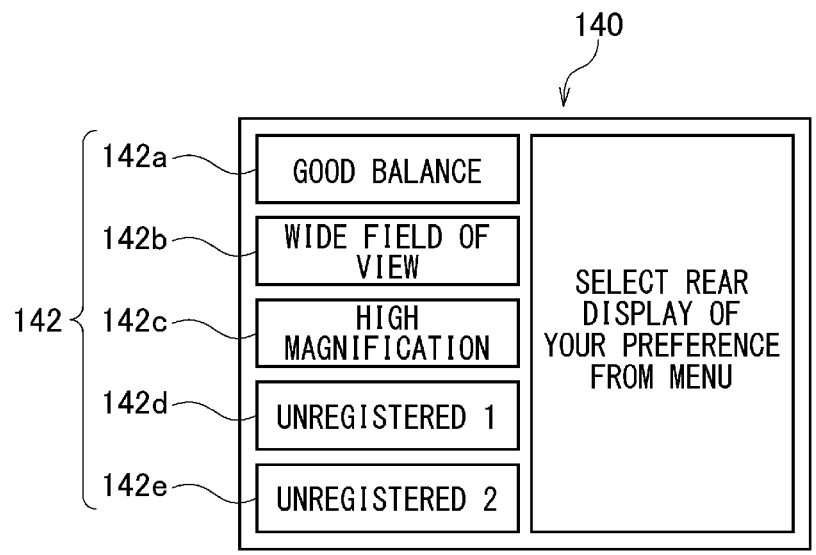
FIG. 8A and FIG. 8B are diagrams showing examples of a setting screen according to the exemplary embodiment.
Figure 8B:
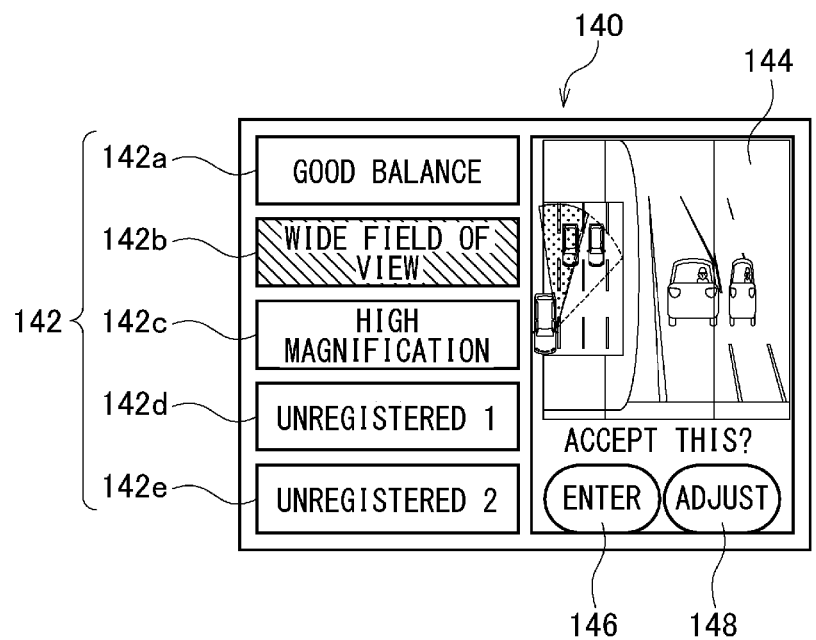

FIG. 8A and FIG. 8B show examples of a setting screen in the exemplary embodiment. The setting screen generation unit 52 displays a setting screen 140 in FIG. 8A at the start of the setting mode for vehicle surroundings monitoring. The setting screen generation unit 52 arranges a plurality of menus 142 (a menu 142a, a menu 142b, a menu 142c, a menu 142d, and a menu 142e) corresponding to different monitoring ranges on the setting screen 140. The setting screen 140 can be considered to be a menu screen.

When a specific menu 142 is selected on the setting screen 140 in FIG. 8A, the setting screen generation unit 52 displays the setting screen 140 in FIG. 8B. The setting screen generation unit 52 arranges a sample image 144 corresponding to the selected menu 142 (the menu 142b "wide field of view" in the figure) on the setting screen 140. The sample image 144 is an image exemplifying the way the display image 80 is shown by the selected menu 142. The sample image 144 corresponds to the alternative image of the adjustment screen 100 shown in FIG. 3, and includes the driver's vehicle CG 112, the bird's-eye view CG 114, and the rear view CG 102 shown in FIG. 3.

When an enter icon 146 in FIG. 8B is selected, the update unit 56 updates the monitoring mode according to the monitoring processing unit 44 by storing the monitoring range and monitoring method corresponding to the selected menu 142 in the setting storage unit 36. That is, in the monitoring device 20 according to the exemplary embodiment, in the setting mode, the monitoring range adjustment is completed by two operations: selecting a menu on the setting screen 140 in FIG. 8A; and selecting the enter icon 146 on the setting screen 140 in FIG. 8B, and the driver can be provided with a means of easy monitoring range adjustment.

When an adjustment icon 148 in FIG. 8B is selected, the setting screen generation unit 52 generates data of the adjustment screen 100 shown in FIG. 3 and displays the adjustment screen 100 on the touch panel 16. The initial mode of the adjustment screen 100 is a mode (for example, a monitoring range, a reduction range, etc.) corresponding to the menu 142 (the menu 142b in the figure) being selected in FIG. 8B. Starting from the monitoring mode corresponding to the menu 142 selected on the setting screen 140, the driver can make adjustments so as to be a desired monitoring target.

As an exemplary variation, the menu selection may be completed only on the setting screen 140 in either FIG. 8A or FIG. 8B. In other words, the setting screen generation unit 52 may display only the setting screen 140 in either FIG. 8A or FIG. 8B. When a specific menu 142 is selected on the setting screen 140, the update unit 56 may store a monitoring range and a monitoring method that correspond to the selected menu 142 in the setting storage unit 36.

Figure 9:
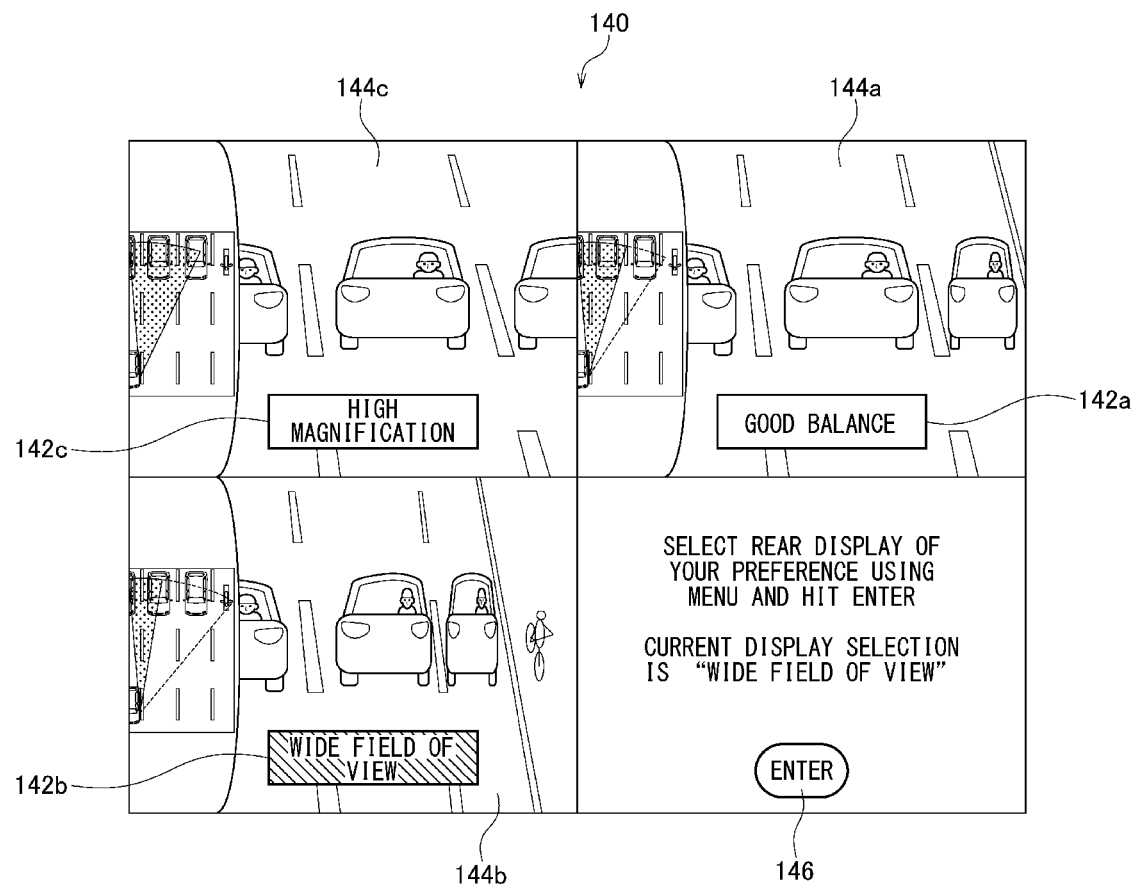
FIG. 9 is a diagram showing a setting screen according to an exemplary variation.

As another exemplary variation, as shown in FIG. 9, the setting processing unit 50 may display a setting screen 140 in which a set of a plurality of menus and a plurality of sample images being associated with each other is arranged in a tile shape. FIG. 9 shows a setting screen 140 in which a set of a menu 142a and a sample image 144a exemplifying the way the view looks, a set of a menu 142b and a sample image 144b exemplifying the way the view looks, and a set of a menu 142c and a sample image 144c exemplifying the way the view looks are arranged. The setting screen 140 according to this exemplary variation also allows the way the screen looks at the time of selecting each menu to be presented to the driver so as to assist the driver in selecting a monitoring range.

Figure 10:
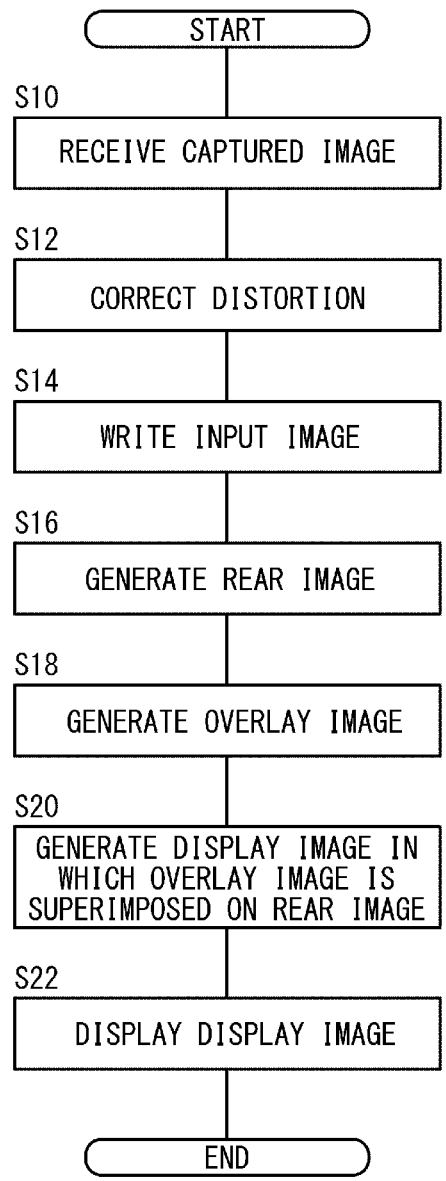
FIG. 10 is a flowchart showing the operation of a monitoring device in a monitoring mode.

FIG. 10 is a flowchart showing the operation related to the image display, which is the operation of the monitoring device 20 in the monitoring mode. Images in the monitoring mode include, for example, the display image 80 shown in FIG. 2. The operation performed when a display image is displayed on the left display 12b based on an image captured by the left camera 10b will now be described. The same applies to the operation performed when a display image is displayed on the right display 12a based on an image captured by the right camera 10a.

The image receiving unit 42 receives an image captured by the left camera 10b (S10). The monitoring processing unit 44 performs distortion correction for the image captured by the left camera 10b (S12), and writes the image obtained after the distortion correction as an input image in an input image buffer in the RAM (S14). According to the setting information stored in the setting storage unit 36, the monitoring processing unit 44 generates a rear image obtained by resizing the input image, and writes the rear image in a rear image buffer of the RAM (S16). The resizing of the input image includes cutting out a portion of the input image and reducing at least a portion of the cutout image. The rear image includes, for example, the same-magnification image 82 and the reduced image 84 in FIG. 2.

The monitoring processing unit 44 generates an overlay image based on image parts stored in the original image storage unit 40, and writes the overlay image into an overlay image buffer in the RAM (S18). The overlay image includes, for example, the driver's vehicle body 76 in FIG. 2. The monitoring processing unit 44 generates a display image in which the overlay image is superimposed on the rear image (S20). The monitoring processing unit 44 outputs the generated display image to the left display 12b so as to display the display image (S22).

Figure 11:
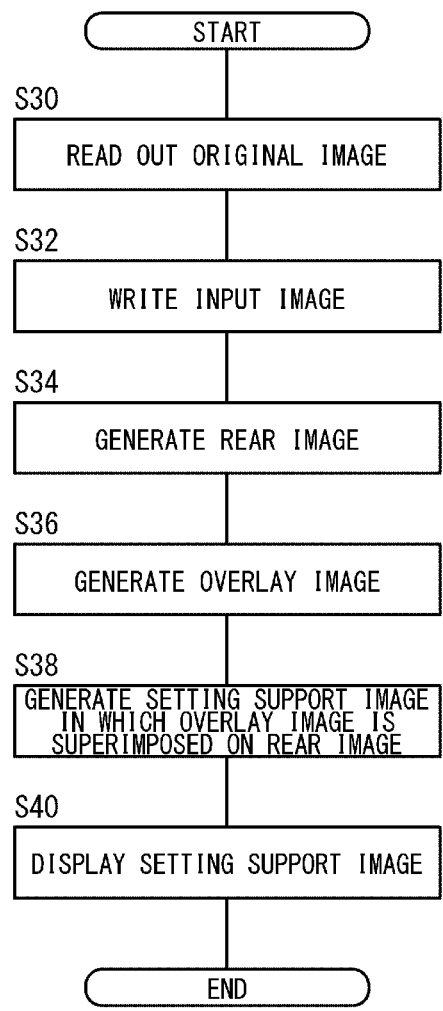
FIG. 11 is a flowchart showing the operation of the monitoring device in a setting mode.

FIG. 11 is a flowchart showing the operation related to the image display, which is the operation of the monitoring device 20 in the setting mode. An image in the setting mode is an image that looks like the display image 80 in the monitoring mode, and is referred to as an alternative image here. The alternative image is, for example, an image of the adjustment screen 100 shown in FIG. 3, and includes a rear view CG 102, a driver's vehicle CG 112, and a bird's-eye view CG 114. Further, the alternative image includes the sample images shown in FIGS. 8B and 9.

The setting screen generation unit 52 of the setting processing unit 50 reads out the original image stored in the original image storage unit 40 (S30), and writes the read original image as an input image in the input image buffer of the RAM (S32). Distortion correction is not required here. According to the setting information stored in the setting storage unit 36, the setting screen generation unit 52 generates a rear image obtained by resizing the input image (S34). That is, the setting screen generation unit 52 generates the rear image from the original image according to a cutout range and a reduction range indicated by the setting information.

Subsequent processes in S36 through S40 are the same as the processes in S18 through S22 of FIG. 10. Thus, the explanation thereof will be omitted. As described above, the alternative image in the setting mode differs from the display image in the monitoring mode only in the source of the image written in the input image buffer. Therefore, in the setting mode, the image displayed in the monitoring mode can be accurately simulated.

As described in relation to FIG. 11, in the exemplary embodiment, an original image including the monitoring ranges in all the menus is stored in the original image storage unit 40, and an alternative image is generated by partially resizing the original image. The resizing includes cutting out a portion of the original image and enlarging or reducing the original image. Thereby, the number of original images can be reduced, and memory capacity for storing the original images can be reduced. As an exemplary variation, an image (CG or photographed image) synthesized in advance for each menu may be used.

When the first menu is selected by the driver, the setting screen generation unit 52 of the setting processing unit 50 generates an alternative image by cutting out a first monitoring range corresponding to the first menu from a single original image. On the other hand, when the second menu is selected by the driver, the setting screen generation unit 52 generates an alternative image by cutting out a second monitoring range corresponding to the second menu from the single original image.

Figure 12:
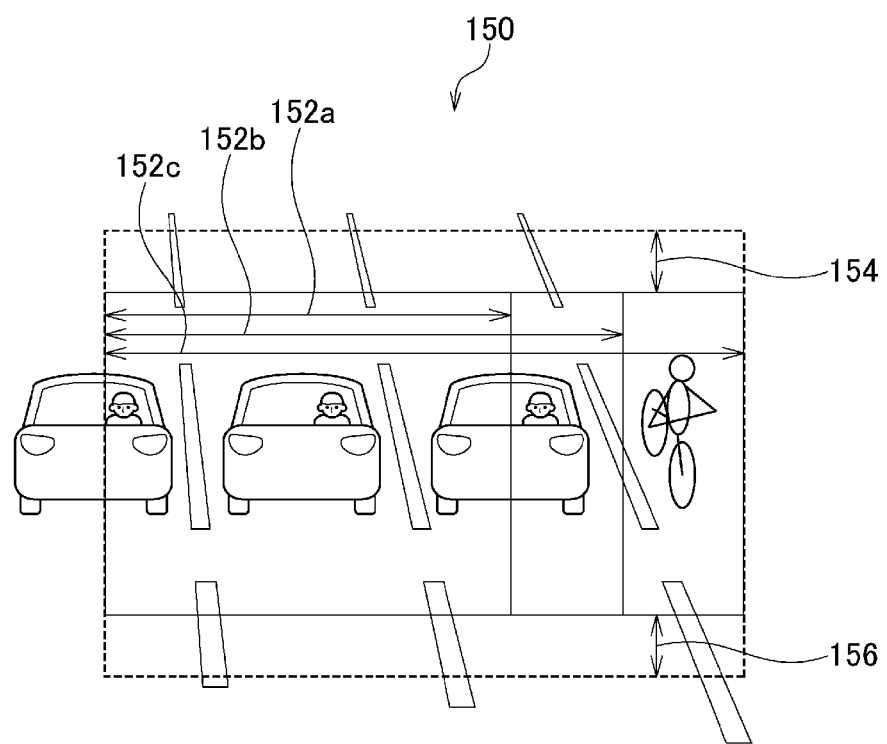
FIG. 12 is a diagram showing a cutout range for cutting out from an original image.

FIG. 12 shows a cutout range for cutting out from an original image 150. A range 152a indicates a cutout range when a menu "high magnification" (that is, a compression range is relatively small) is selected. A range 152b indicates a cutout range when a menu "good balance" (that is, the compression range is medium) is selected. A range 152c indicates a cutout range when a menu "wide field of view" (that is, the compression range is relatively large) is selected. A space 154 indicates an upward adjustment space for the monitoring range, and a space 156 indicates a downward adjustment space for the monitoring range.

When the adjustment icon 148 is selected on the setting screen 140 and manual adjustment is performed on the adjustment screen 100, the setting screen generation unit 52 changes the cutout range in the vertical and horizontal directions according to the operation of the driver. When the changed cutout range falls outside the original image, the setting screen generation unit 52 displays "reached the adjustable limit" on the adjustment screen 100 without changing the cutout range.

Figure 13:
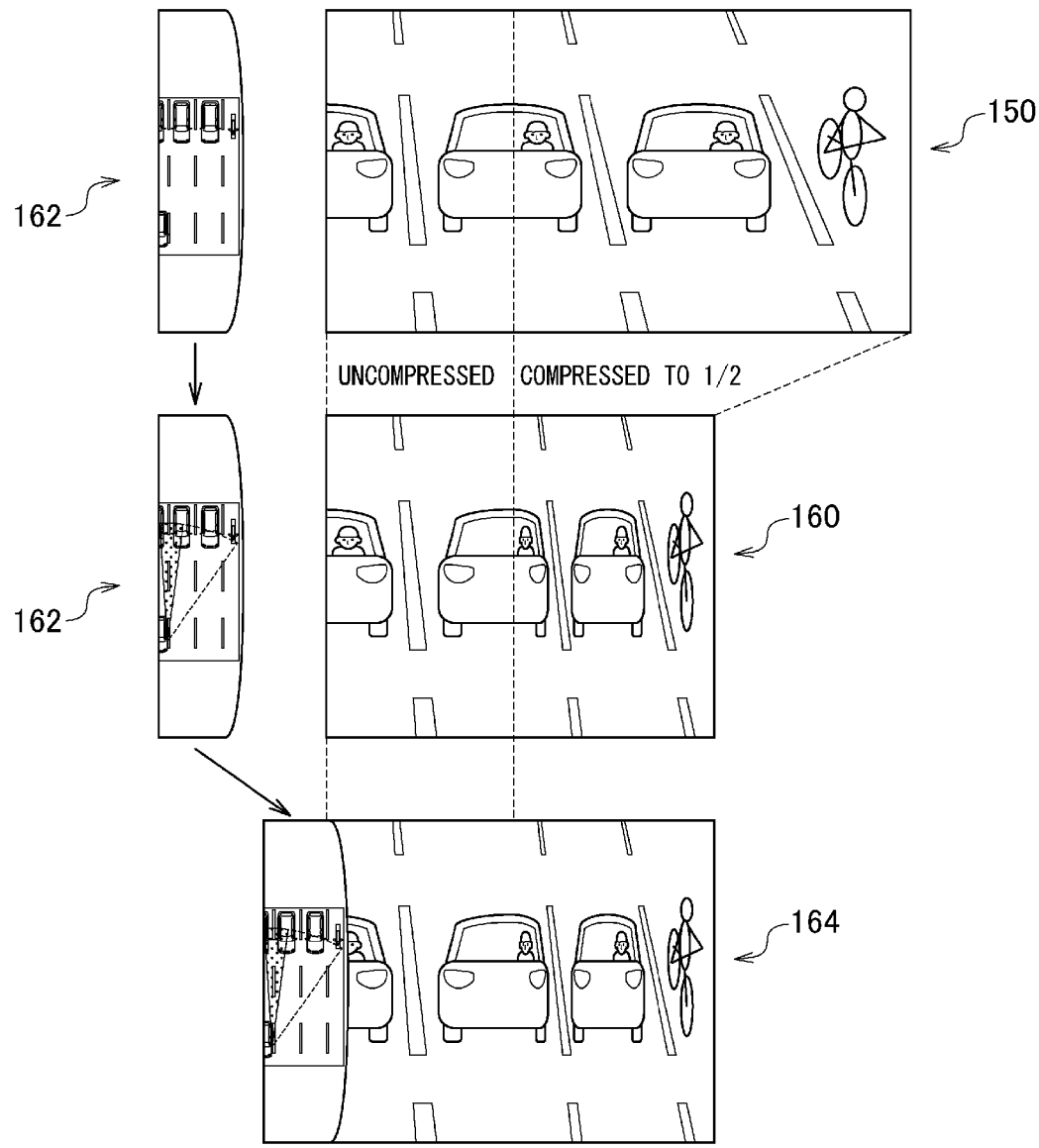
FIG. 13 is a diagram schematically showing a method for generating an alternative image.

FIG. 13 shows an example of generating an alternative image 164. For example, when the menu "wide field of view" is selected, the setting screen generation unit 52 leaves a region that is one-third of the entire original image 150 near the driver's vehicle body uncompressed and compresses a region that is the remaining two-thirds (for example, compression to half the width) so as to generate a rear image 160 in which both regions are combined. The setting screen generation unit 52 generates an alternative image 164 by superimposing an overlay image 162 on the rear image 160. As shown in FIG. 3, the overlay image 162 includes the driver's vehicle CG 112 and the bird's-eye view CG 114. Thereby, it is possible to present to the driver the alternative image 164 that allows for intuitive understanding of the way the rear view looks and a viewable range when the menu "wide field of view" is selected.

When the menu "high magnification" is selected, the setting screen generation unit 52 cuts out a region that is two-thirds of the original image 150 near the driver's vehicle body, and sets the cut out image as the rear image 160 without compression. When the menu "good balance" is selected, the setting screen generation unit 52 cuts out a region that is five-sixths of the original image 150 near the driver's vehicle body. The setting screen generation unit 52 leaves a region that is three-fifths of the cutout image near the driver's vehicle body uncompressed, and compresses a region that is the remaining two-fifths of the cutout image (for example, compression to half the width) so as to generate a rear image 160 in which both regions are combined. That is, half the width in the case of the menu "wide field of view" is compressed under the menu "good balance". In this way, the setting screen generation unit 52 cuts out a different range from one original image 150 according to a selected menu so as to generate an alternative image 164.

As shown in FIGS. 5A and 5B, the monitoring processing unit 44 expands the field of view range of the right camera 10a (or the left camera 10b) in the horizontal direction in linkage with the operation of the right blinker (or the left blinker). For a blinker-linked field of view range, the driver may select a menu independently of the field of view range during normal traveling (when the blinker is not operating). Alternatively, the blinker-linked field of view range may be automatically set according to a menu selected for normal traveling. In the exemplary embodiment, the latter is employed.

The update unit 56 of the setting processing unit 50 sets a plurality of monitoring ranges corresponding to a plurality of traveling states in a batch in response to a single occurrence of menu selection made by the driver. FIG. 14 shows an example of batch setting of a plurality of monitoring ranges. When the menu "high magnification" (that is, the minimum field of view) is selected for the normal mode (during normal traveling), the update unit 56 automatically sets a monitoring range that corresponds to the menu "good balance" (medium field of view) as a monitoring range in a blinker-linked mode.

Further, when the menu "good balance" is selected for the normal mode, the update unit 56 automatically sets a monitoring range that corresponds to the menu "wide field of view" (that is, the maximum field of view) as the monitoring range in the blinker-linked mode. Further, when the menu "wide field of view" is selected for the normal mode, the update unit 56 automatically sets a monitoring range that corresponds to the menu "wide field of view" as the monitoring range in the blinker-linked mode.

In this way, as the monitoring range in the blinker-linked mode, the update unit 56 automatically sets a monitoring range that is a notch wider than a monitoring range for a menu selected for the normal mode. As a result, even when there are a plurality of monitoring ranges corresponding to a plurality of traveling states, the driver only needs to select the monitoring range during normal traveling, and the work load on the driver can be reduced.

Further, as shown in FIGS. 6A and 6B, the monitoring processing unit 44 expands the field of view range of the right camera 10a (or the left camera 10b) in the vertical direction in linkage with the operation of the reverse gear. For a reverse gear-linked field of view range, the driver may select a menu independently of the field of view range during normal traveling (when the reverse gear is not operating, and typically when the drive gear is operating). Alternatively, the reverse gear-linked field of view range may be automatically set according to a menu selected for normal traveling. In the exemplary embodiment, the latter is employed.

FIG. 15 shows an example of batch setting of a plurality of monitoring ranges. When the menu "high magnification" is selected for the normal mode (during normal traveling), the update unit 56 automatically sets a monitoring range (medium field of view) expanded to a rear wheel installation position as a monitoring range in a rear gear-linked mode. When the menu "good balance" is selected for the normal mode, the update unit 56 automatically sets a monitoring range (maximum field of view) expanded to the front of the rear wheels as the monitoring range in the rear gear-linked mode. When the menu "wide field of view" is selected for the normal mode, the update unit 56 automatically sets a monitoring range expanded to the front of the rear wheels as the monitoring range in the rear gear-linked mode.

In this way, the update unit 56 may automatically set, as the monitoring range in the rear gear-linked mode, a wider monitoring range as the monitoring range in the normal mode becomes wider. As a result, even when there are a plurality of monitoring ranges corresponding to a plurality of traveling states, the driver only needs to select the monitoring range during normal traveling, and the work load on the driver can be reduced. In order to widen the monitoring range, the monitoring processing unit 44 compresses an image of the vicinity of the rear wheels vertically and displays the image. For those who select compressed display in the horizontal direction during normal driving, compressed display in the vertical direction is considered to be easily acceptable.

Next, a vehicle interior monitoring process in the vehicle 1 will be described. The monitoring processing unit 44 of the monitoring device 20 performs at least one of a process of displaying a captured image corresponding to the monitoring range on the touch panel 16 and a process of detecting the state of the monitoring range in the monitoring mode of vehicle interior monitoring. In the exemplary embodiment, both the displaying process and the detecting process can be performed according to a setting made by the driver.

In a vehicle interior monitoring setting mode, the setting processing unit 50 can display a setting screen that allows for setting a monitoring range (a monitoring target described later) according to the displaying process and a monitoring range (a warning target described later) according to the detecting process independently of each other. This allows for flexible setting of the monitoring mode, and the driver can set the monitoring mode that matches the driver's preference and convenience. The setting screen for vehicle interior monitoring is a screen for allowing the driver to set the monitoring mode for the vehicle interior, and includes a monitoring pattern selection screen and a monitoring pattern determination screen that are described later.

More specifically, the monitoring processing unit 44 has both (1) a function of supporting monitoring by the driver by displaying a video image of the vehicle interior including the rear seats, and (2) a function of monitoring the movement in the vehicle interior including the rear seats. The monitoring function of (2) includes both a function of giving a warning if there is an inclination toward sleeping (half sleep state or sleeping, etc.) and a function of displaying a wakefulness state (awake, half sleep state, sleeping, etc.).

The setting processing unit 50 has a function of easily setting a monitoring target and a warning target in the vehicle interior in a menu format in the same way as in the vehicle surroundings monitoring. The monitoring target is a target for displaying an image captured by the vehicle interior camera 14. The warning target is a target to whom a warning is output when an inclination toward sleeping is detected. The setting screen generation unit 52 of the setting processing unit 50 generates a monitoring pattern selection screen and displays the monitoring pattern selection screen on the touch panel 16.

Figure 16:
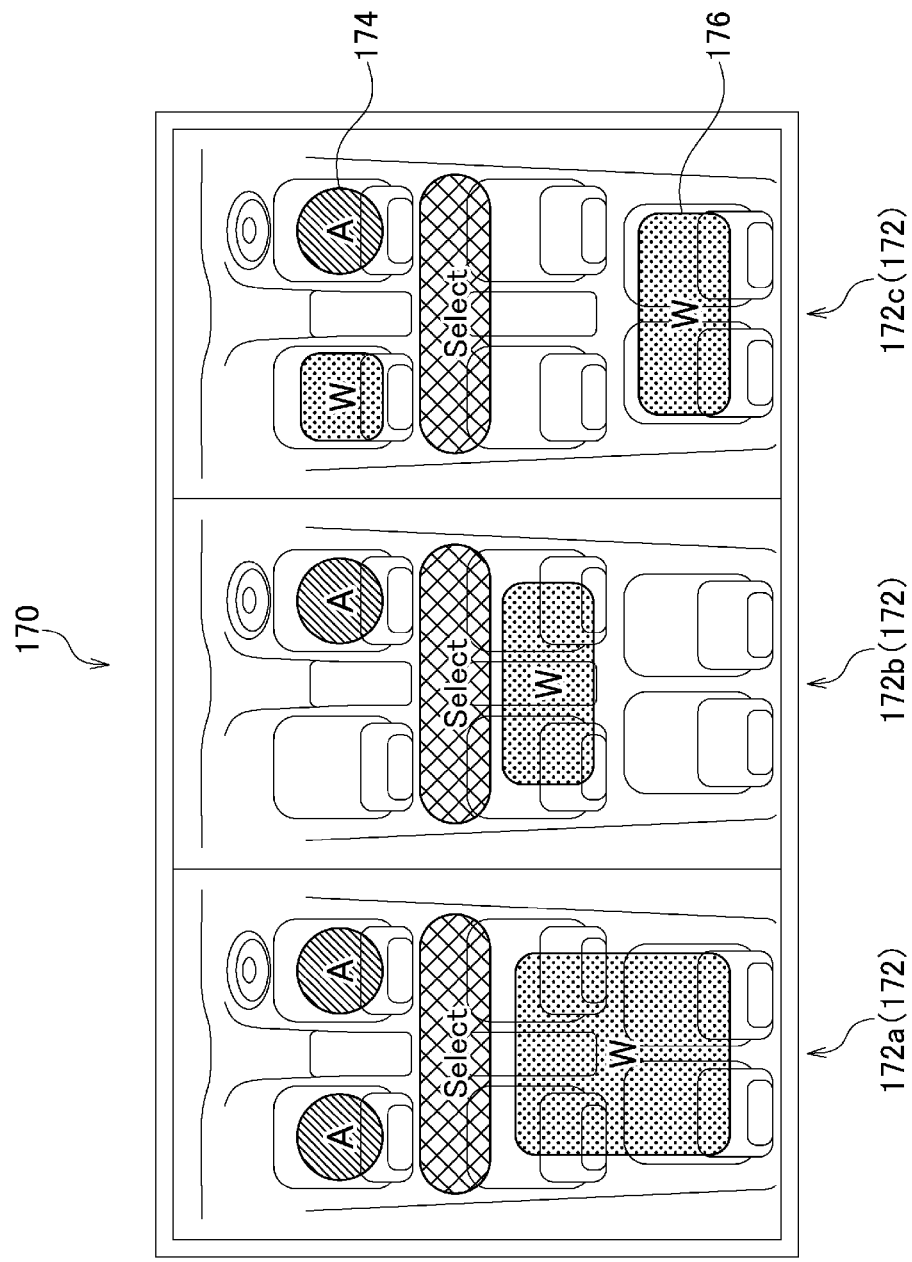
FIG. 16 is a diagram showing an example of a monitoring pattern selection screen.

FIG. 16 shows an example of the monitoring pattern selection screen. The monitoring pattern selection screen 170 includes an alternative image including an image of seats in the vehicle interior. This alternative image may be a CG or a pre-captured photographed image. Further, the monitoring pattern selection screen 170 includes three menus 172 (a menu 172a, a menu 172b, and a menu 172c) showing three monitoring patterns, respectively.

An alert icon 174 is an icon that designates the outputting of a predetermined warning sound from the speaker 18 if an occupant in a corresponding seat shows an inclination toward sleeping. A monitoring icon 176 is an icon that designates the display of a video image of the occupant in the corresponding seat (typically, a video image including the face) on the touch panel 16. The alert icon 174 and the monitoring icon 176 are arranged in association with at least one seat. The alert icon 174 and the monitoring icon 176 are set to have different shapes and different colors from each other. This makes it possible to identify the icons regardless of the individual difference in the color perception of the driver.

The menu 172a in FIG. 16 is a menu indicating that occupants in the left and right seats in the first row (occupants in the driver's seat and the passenger seat) are warning targets and occupants in all seats in the second and third rows are monitoring targets. The menu 172b is a menu indicating that an occupant in the driver's seat is a warning target and occupants in the left and right seats in the second row are monitoring targets. The menu 172c is a menu indicating that an occupant in the driver's seat is a warning target and occupants in the passenger seat and occupants in the left and right seats in the third row are monitoring targets.

The monitoring processing unit 44 extracts a video image of the occupant who is the monitoring target from an image captured by the vehicle interior camera 14 and displays the video image on the touch panel 16. Further, the wakefulness detection unit 46 of the monitoring processing unit 44 determines whether or not the occupant, who is the warning target, shows an inclination toward sleeping based on the image captured by the vehicle interior camera 14. When the occupant, who is the warning target, shows an inclination toward sleeping, the monitoring processing unit 44 outputs a predetermined warning sound from the speaker 18.

When a specific menu 172 is selected on the monitoring pattern selection screen 170, the setting screen generation unit 52 generates a monitoring pattern determination screen and displays the monitoring pattern determination screen on the touch panel 16. If there is no menu 172 that exactly matches a pattern of his/her preference on the monitoring pattern selection screen 170, the driver selects a menu 172 that is closest to the pattern of his/her preference.

Figure 17:
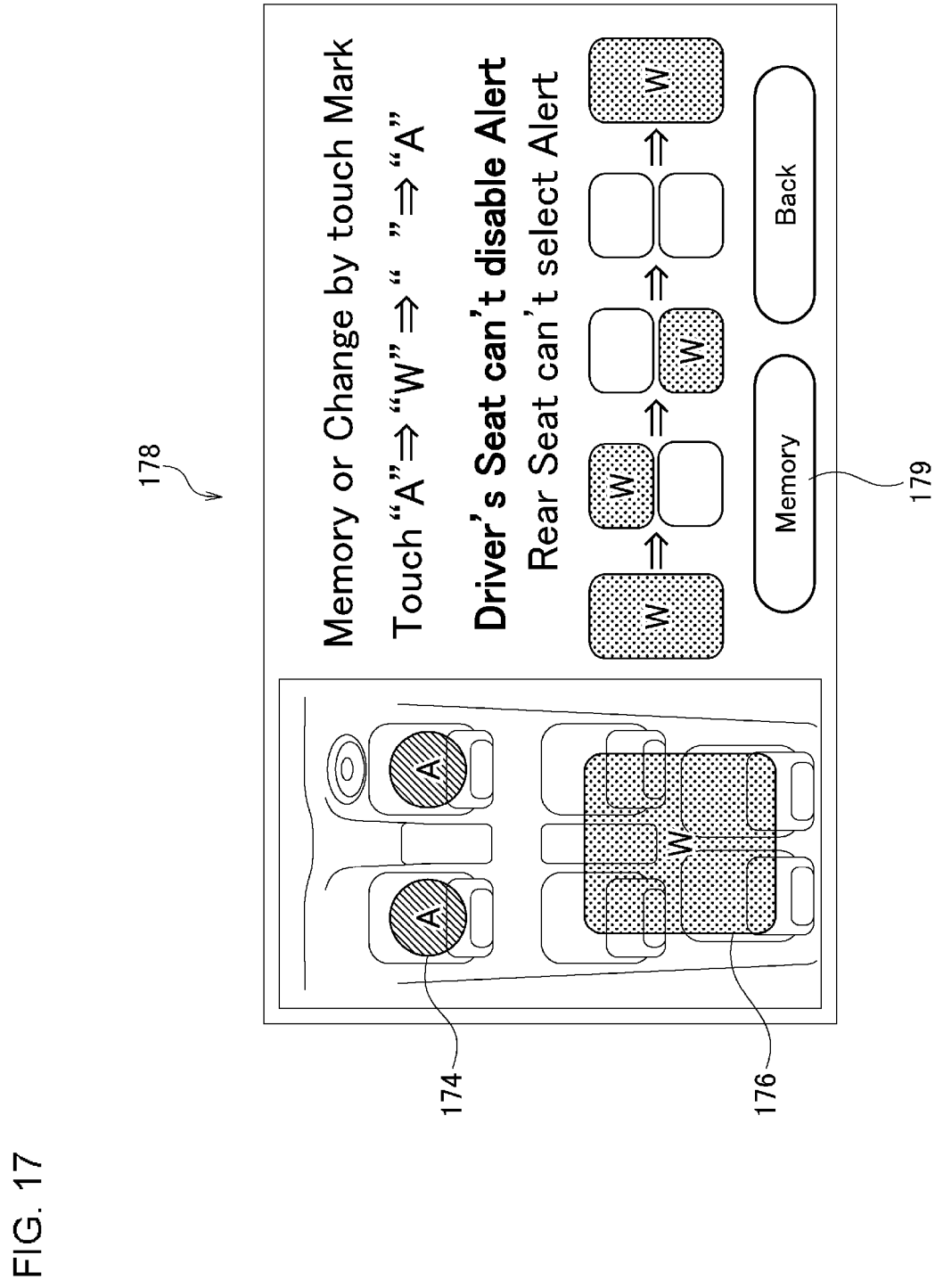
FIG. 17 is a diagram showing an example of a monitoring pattern determination screen.

FIG. 17 shows an example of the monitoring pattern determination screen. The figure shows a monitoring pattern determination screen 178 displayed when the menu 172a is selected on the monitoring pattern selection screen 170 in FIG. 16. The driver selects a seat that requires a change in the monitoring mode. The setting screen generation unit 52 changes the alert icon 174 or the monitoring icon 176 on the respective seats in a cyclic manner according to the selection operation.

In this case, it is assumed that the driver changes the alert icon 174 on the passenger seat to a monitoring icon 176 and selects a registration icon 179. When the registration icon 179 is selected, the update unit 56 stores setting information indicating the vehicle interior monitoring mode set on the monitoring pattern determination screen 178 in the setting storage unit 36. Thereby, the vehicle interior monitoring mode set on the monitoring pattern determination screen 178 is reflected in the vehicle interior monitoring process performed by the monitoring processing unit 44. At the same time, the update unit 56 stores the setting information in the user information storage unit 38 in association with the driver's ID.

Further, the update unit 56 stores a pattern last registered on the monitoring pattern determination screen 178 as the first candidate for the vehicle interior monitoring mode, a pattern selected on the monitoring pattern selection screen 170 as the second candidate, and a pattern arranged on the left side among the patterns not selected on the selection screen 170 as the third candidate in the user information storage unit 38 in association with the driver's ID. When the monitoring pattern selection screen 170 is displayed next time, the setting screen generation unit 52 arranges the three menus 172 showing the respective patterns of the first candidate to the third candidate on the monitoring pattern selection screen 170.

Figure 18:
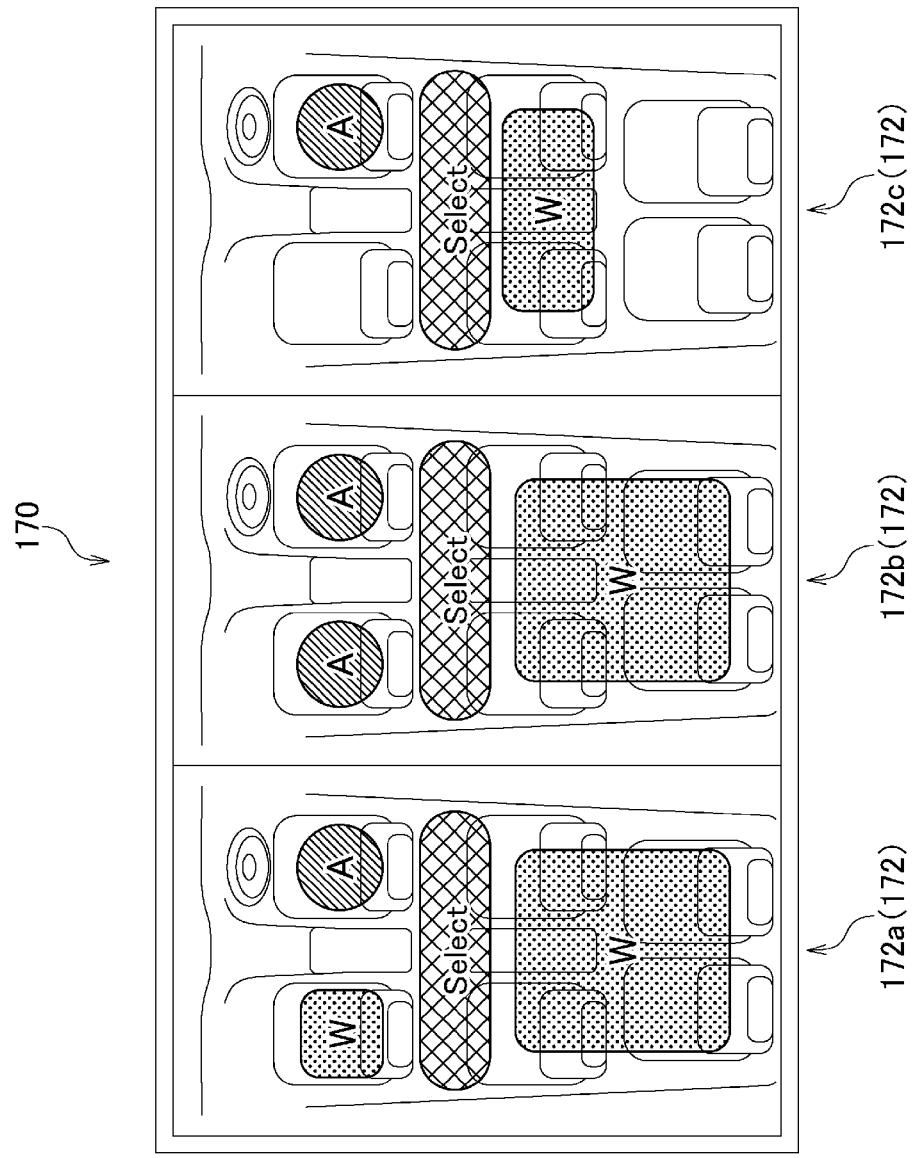
FIG. 18 is a diagram showing an example of a monitoring pattern selection screen.

FIG. 18 shows an example of the monitoring pattern selection screen. The figure shows the monitoring pattern selection screen 170 at the time of the next startup. The menu 172a on the monitoring pattern selection screen 170 corresponds to the pattern of the first candidate for the vehicle interior monitoring mode. The menu 172b corresponds to the pattern of the second candidate for the vehicle interior monitoring mode. The menu 172c corresponds to the pattern of the third candidate for the vehicle interior monitoring mode. Thereby, on the monitoring pattern selection screen 170, a monitoring pattern that is assumed to be most preferred by the driver is displayed at the left end. The driver can complete the setting for the vehicle interior monitoring in two steps of selecting the leftmost menu 172a and selecting the registration icon 179 on the monitoring pattern determination screen 178.

In this way, the setting processing unit 50 changes at least one of the monitoring range and the monitoring method in accordance with a user operation in the setting mode of the vehicle interior monitoring. The setting processing unit 50 displays a menu indicating the changed monitoring range or monitoring method on the monitoring pattern selection screen 170 as one of a plurality of menus that can be selected by the driver. This allows the driver to easily set a monitoring mode of his/her preference.

It is assumed that the driver has changed from the first driver to the second driver and that the second driver has selected the menu 172c at the right end in FIG. 18 and performed registration after making changes appropriately on the monitoring pattern determination screen 178. In this case, the last pattern registered by the first driver remains at the right end of the monitoring pattern selection screen 170. Therefore, even when the driver changes to the first driver again, the first driver can easily bring back the pattern registered by himself/herself.

Figure 19:
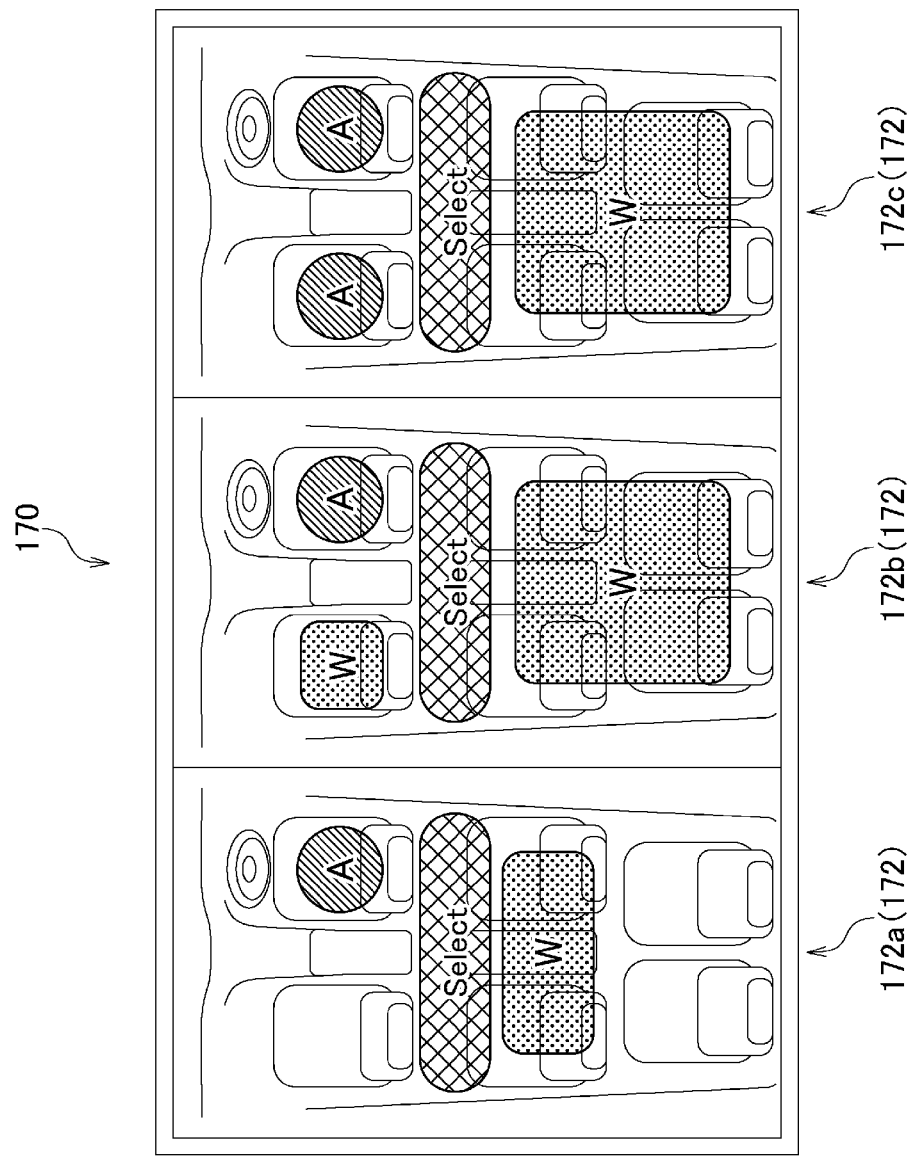
FIG. 19 is a diagram showing an example of a monitoring pattern selection screen.

When the rightmost menu 172c is selected on the monitoring pattern selection screen 170 in FIG. 18 and is directly registered without being changed on the adjustment icon 180, the setting screen generation unit 52 displays the monitoring pattern selection screen 170 shown in FIG. 19 at the time of the next display of a monitoring pattern selection screen. In other words, the pattern of the menu 172c selected on the monitoring pattern selection screen 170 in FIG. 18 moves to the leftmost menu 172a. The patterns of the menu 172a and the menu 172b that have not been selected on the monitoring pattern selection screen 170 in FIG. 18 are displayed such that the patterns are each shifted to the right by one on the monitoring pattern selection screen 170 in FIG. 19.

An explanation will be given regarding a process related to vehicle-specific restrictions. If the change in the monitoring range or monitoring method instructed through the user operation does not comply with the laws and regulations or the demand for safety, the setting processing unit 50 prohibits the change. For example, if the change on the setting screen does not comply with the laws and regulations or the demand for safety, the setting screen generation unit 52 of the setting processing unit 50 may display an image or a message indicating that the change is prohibited on the setting screen. Further, the update unit 56 of the setting processing unit 50 may suppress the storage of data (setting information) related to changes that do not comply with the laws and regulations or the demand for safety in the setting storage unit 36 and the user information storage unit 38.

In vehicles, legal requirements and safety assurance requirements are prioritized over user's intentions. The setting processing unit 50 can realize monitoring inside and outside the vehicle in compliance with the laws by not giving options that fail to conform to the legal requirements and safety assurance requirements and refusing changes that fail to conform to those requirements. Also, the safety of the vehicle can be further enhanced.

First, restrictions related to vehicle interior monitoring will be explained. In principle, the setting processing unit 50 prohibits changes that stop the wakefulness detection on the driver (in other words, the driver's seat). More specifically, the setting screen generation unit 52 does not display a menu 172 in which an alert icon 174 is removed from the driver on the monitoring pattern selection screen 170 related to vehicle interior monitoring. Further, the setting screen generation unit 52 invalidates an operation of changing (deletion, etc.) the alert icon 174 for the driver on the monitoring pattern determination screen 178 related to vehicle interior monitoring, and does not accept the operation.

As an exception, when the vehicle 1 is equipped with a controller for automatic driving at a predetermined level or higher (not shown) and the automatic driving is performed under predetermined conditions, the setting processing unit 50 may allow to stop wakefulness detection on the driver or stop, suppress, or induce the stopping of warnings associated with the wakefulness detection on the driver. This applies when taking a nap in the driver's seat is allowed at the time of cruising on a highway in a section that does not have branches in a sufficiently advanced self-driving mode, and if the level of automatic driving is sufficiently high, flexible vehicle interior monitoring can be realized by alleviating the restrictions, and the convenience for vehicle interior monitoring can be further enhanced. The above-mentioned suppression of warnings means, for example, when a decrease in wakefulness is detected while cruising in an advanced self-driving mode, the driver is notified of the decrease in the wakefulness through a warning sound with suppressed volume or a warning only by display. Further, induction to the stopping means notifying the driver that the warning can be stopped if the driver has an intention to take a nap, and displaying a setting menu screen including the stopping of the warning. In this way, by encouraging the driver to take a nap under appropriate conditions, it is possible to drive more safely.

In the exemplary embodiment, if the level of automatic driving is four or higher and the driver is driving on a highway, the setting screen generation unit 52 of the setting processing unit 50 enables and receives an operation of removing an alert icon 174 from the driver on the monitoring pattern determination screen 178. It should be noted that needless to say, it is necessary to check the conditions under which taking a nap in the driver's seat is permitted. The update unit 56 stores setting information in which the alert icon 174 has been removed from the driver as valid setting information in the setting storage unit 36 and the user information storage unit 38. The setting processing unit 50 may acquire the type of a road on which the vehicle 1 is currently traveling from a navigation system (not shown) mounted on the vehicle 1 via an in-vehicle LAN or the like so as to determine whether or not the vehicle 1 is traveling on a highway.

Next, the restrictions on vehicle surroundings monitoring will be explained. As described previously, when the adjustment icon 148 is selected on the setting screen 140 in FIG. 8B, the setting screen generation unit 52 generates data of an adjustment screen for the user to manually adjust the monitoring range and displays the adjustment screen on the touch panel 16.

Figure 20:
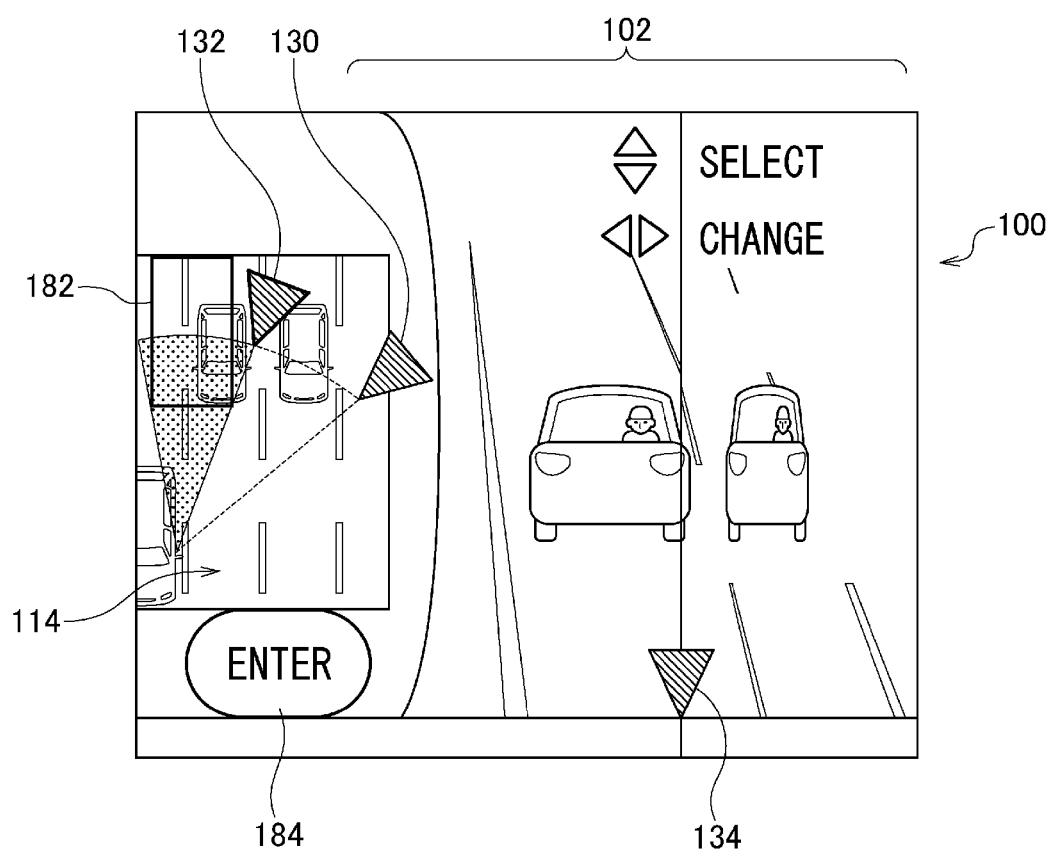
FIG. 20 is a diagram showing an example of an adjustment screen.

FIG. 20 corresponds to FIG. 4 and shows an example of the adjustment screen. On an adjustment screen 100 in FIG. 20, the user selects a target item from among an outer limit angle 130, a compression boundary 132, and an uncompressed screen range 134 and adjusts the selected target item through an operation in the horizontal direction or the like (hereinafter, "also referred to as "adjustment operation"). The setting screen generation unit 52 updates the display content of the bird's-eye view CG 114 and the rear view CG 102 according to a user's adjustment operation. When an enter icon 184 is selected on the adjustment screen 100, the setting screen generation unit 52 displays a registration screen described later.

As described previously, a space around the vehicle 1 includes a regulation area 182. In the exemplary embodiment, it is assumed that a regulation area must be included in a range to be displayed at the same magnification. When an adjustment operation is input to the adjustment screen 100, the inspection unit 54 of the setting processing unit 50 inspects whether or not the adjustment operation complies with the laws and regulations or the demand for safety. More specifically, the inspection unit 54 inspects whether or not the regulation area is within the range displayed at the same magnification, in other words, whether or not a compressed display range covers at least a part of the regulation area by the adjustment operation of the user.

On the adjustment screen 100 in FIG. 20, when the compression boundary 132 is selected as the target item and the compression boundary 132 is moved to the left, that is, when an adjustment operation for narrowing the range displayed at the same magnification is input, the compressed display range covers the regulation area 182. In this case, the inspection unit 54 determines that the user's adjustment operation does not comply with the laws and regulations or the demand for safety.

When it is determined that the user's adjustment operation does not comply with the laws and regulations or the demand for safety, the setting screen generation unit 52 recognizes that the user's adjustment operation is invalid and does not change the position of the compression boundary 132. At the same time, the setting screen generation unit 52 notifies the user that there is a restriction by blinking the image of the regulation area 182. The setting screen generation unit 52 may display a message on the adjustment screen 100 that indicates that it is prohibited to include the regulation area 182 in the compressed display range.

Figure 21A:
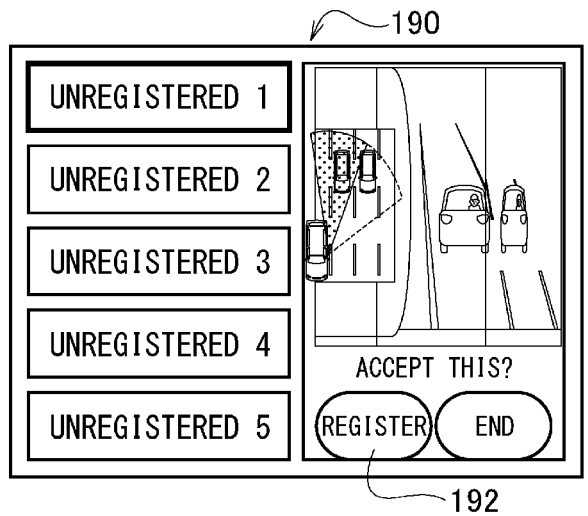
FIG. 21A to FIG. 21C are diagrams explaining registration of adjustment results.
Figure 21B:
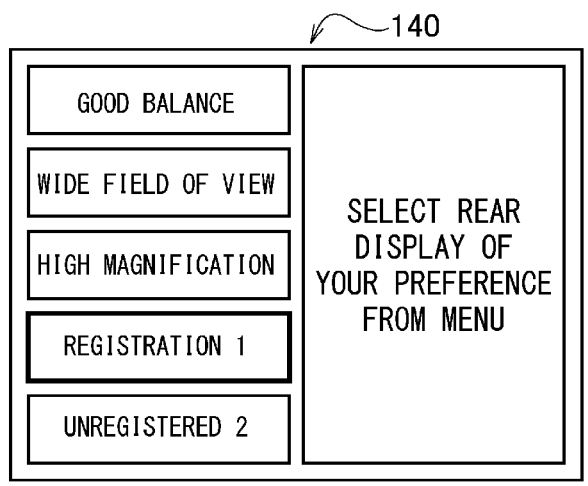
Figure 21C:
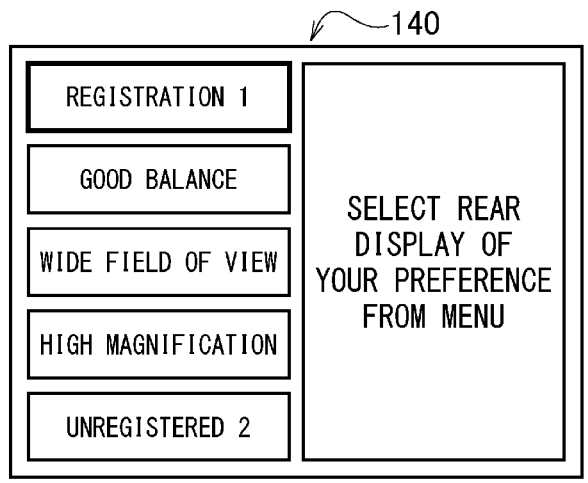

FIG. 21A to FIG. 21C are diagrams explaining registration of adjustment results. FIG. 21A shows an example of a registration screen. When a registration icon 192 is selected, the update unit 56 stores setting information (hereinafter, also referred to as "custom setting") indicating the adjustment result on the adjustment screen 100 in a memory area corresponding to "Unregistered 1" in the setting storage unit 36. The update unit 56 or the user may change "Unregistered 1" to an arbitrary name ("Registration 1" or the like). The user may select which of memory areas "Unregistered 1" to "Unregistered 5" is used to save the custom setting. Further, from among the memory areas corresponding to "Unregistered 1" to "Unregistered 5", the update unit 56 automatically overwrites and saves the custom setting in a memory area with the oldest time when the custom setting was last used in the monitoring process.

The setting screen generation unit 52 displays a menu indicating a custom setting that has been registered side by side with basic menus (for example, "wide field of view", "good balance", "high magnification") prepared in advance by the monitoring device 20 when the setting screen 140 is displayed next time. This allows the user to select a customized monitoring range with a single touch.

The display order of the menus may be a fixed order as shown in the setting screen 140 in FIG. 21B. That is, the custom setting may be arranged under the basic menus. Further, the display order of the menus may be such that the newer the registration, the higher the display position, as in the setting screen 140 in FIG. 21C.

When the number of registered custom settings becomes three or more, the setting screen generation unit 52 may hide the one with the oldest last usage time among the basic menus on the setting screen 140, and arrange three custom settings and two basic menus on the setting screen 140. That is, on the setting screen 140, the custom settings may be displayed with priority over the basic menus. Further, the setting screen generation unit 52 may limit the number of custom settings displayed on the setting screen 140 to two and always display three basic menus on the setting screen 140.

Described above is an explanation on the present disclosure based on the exemplary embodiment. The exemplary embodiment is intended to be illustrative only, and it will be understood by those skilled in the art that various modifications to constituting elements and processes of the exemplary embodiment could be developed and that such modifications are also within the scope of the present disclosure.

Optional combinations of the aforementioned exemplary embodiment and exemplary variation will also be within the scope of the present disclosure. New embodiments resulting from the combinations have combined effects of the exemplary embodiments and exemplary variation that are combined. It will be obvious to those skilled in the art that the function to be achieved by each constituent requirement described in the claims are achieved by each constituting element shown in the exemplary embodiment and in the exemplary variation or by a combination of the constituting elements.

The technologies according to the exemplary embodiment and the exemplary variation may be defined by the following items.

[Item 1]
A monitoring device including:
a receiving unit that receives an image captured by an image capturing device mounted on a vehicle;
a monitoring processing unit that performs a monitoring process for a preset monitoring range based on the captured image received by the receiving unit; and
a setting processing unit that sets the monitoring range of the monitoring processing unit, wherein
the setting processing unit displays a menu screen including a plurality of menus indicating different monitoring ranges on a display device, and sets a monitoring range corresponding to a menu selected by the user from the plurality of menus as a monitoring range of the monitoring processing unit.

[Item 2]
The monitoring device according to Item 1, wherein
the setting processing unit displays an alternative image that looks like a monitoring range on the menu screen, and
the alternative image is generated using an artificially synthesized image or a pre-captured original image.

[Item 3]
The monitoring device according to Item 2, wherein
the monitoring range is the interior of a vehicle, and
the alternative image includes an image of a seat.

[Item 4]
The monitoring device according to Item 2, wherein
the monitoring range includes the surroundings of the vehicle, and
the alternative image includes an image of another vehicle, an image of a pedestrian, an image of a road sign, or an image of a road marking.

[Item 5]
The monitoring device according to Item 4, wherein
the setting processing unit generates a plurality of alternative images that correspond to the plurality of menus by cutting out different ranges from a common original image.

[Item 6]
The monitoring device according to any one of Items 1 through 5, wherein
the monitoring processing unit performs at least one of a process of displaying a captured image corresponding to the monitoring range on the display device and a process of detecting the state of the monitoring range, and
when the displaying process and the detecting process are both performed, a monitoring range according to the displaying process and a monitoring range according to the detecting process can be set independently of each other.

[Item 7]
The monitoring device according to any one of Items 1 through 6, wherein
the setting processing unit changes a monitoring range or a monitoring method in accordance with a user operation, and
the setting processing unit displays a menu indicating the changed monitoring range or monitoring method as one of a plurality of menus that can be selected by the user.

[Item 8]
The monitoring device according to Item 7, wherein
if the change in the monitoring range or monitoring method instructed through the user operation does not comply with the laws and regulations or the demand for safety, the change is prohibited.

[Item 9]
The monitoring device according to Item 8, wherein
the monitoring range is the interior of a vehicle,
the monitoring method includes wakefulness detection, and
the setting processing unit prohibits changes that stop the wakefulness detection on the driver.

[Item 10]
The monitoring device according to Item 9, wherein
depending on the level of automatic driving, the setting processing unit allows to stop the wakefulness detection on the driver, stops or suppresses warnings associated with the wakefulness detection on the driver, or induces the stopping of the warnings.

[Item 11]
The monitoring device according to any one of Items 1 through 10, further including:
an identification unit that identifies the user; and
a storage unit that stores a monitoring range and a monitoring method in association with the user, wherein
the setting processing unit sets, as the monitoring range or monitoring method of the monitoring processing unit, a monitoring range or a monitoring method stored in advance in association with the user when the monitoring device is activated or a user change is detected.

[Item 12]
The monitoring device according to any one of Items 1 through 11, wherein
a plurality of monitoring ranges are provided that correspond to a plurality of traveling states of the vehicle, and
the setting processing unit sets a plurality of monitoring ranges that correspond to the plurality of traveling states in a batch in response to a single occurrence of menu selection made by the user.

[Item 13]
The monitoring device according to Item 12, wherein
the plurality of monitoring ranges include at least one of a first monitoring range that corresponds to a blinker operation of the vehicle and a second monitoring range that corresponds to a rear gear of the vehicle.

[Item 14]
A monitoring system including:
an image capturing device that is mounted on a vehicle;
a display device that is mounted on the vehicle; and
a monitoring device that is mounted on the vehicle, wherein
the monitoring device includes:
a receiving unit that receives an image captured by the image capturing device;
a monitoring processing unit that performs a monitoring process for a preset monitoring range based on the captured image received by the receiving unit; and
a setting processing unit that sets the monitoring range of the monitoring processing unit, and
the setting processing unit displays a menu screen including a plurality of menus indicating different monitoring ranges on the display device, and sets a monitoring range corresponding to a menu selected by the user from the plurality of menus as the monitoring range of the monitoring processing unit.

[Item 15]
A vehicle including:
an image capturing device; a display device; and a monitoring device, wherein
the monitoring device includes:
a receiving unit that receives an image captured by the image capturing device;

a monitoring processing unit that performs a monitoring process for a preset monitoring range based on the captured image received by the receiving unit; and a setting processing unit that sets the monitoring range of the monitoring processing unit, wherein the setting processing unit displays a menu screen including a plurality of menus indicating different monitoring ranges on the display device, and sets a monitoring range corresponding to a menu selected by the user from the plurality of menus as the monitoring range of the monitoring processing unit.

[Item 16]

A monitoring method implemented by a computer mounted on a vehicle, including:

receiving an image captured by an image capturing device mounted on the vehicle;

performing a monitoring process for a preset monitoring range based on the captured image; and displaying a menu screen including a plurality of menus indicating different monitoring ranges on a display device, and setting a monitoring range corresponding to a menu selected by the user from the plurality of menus as the monitoring range in the monitoring process.

What is claimed is:

1. A displaying method for at least one display mounted on a vehicle, the displaying method comprising:

displaying first images on at least one screen of the at least one display, each of the first images corresponding to a first part of each of second images, the second images being captured by an image capturing device mounted on the vehicle, the first part of the each of the second images having a first range of the each of the second images;

displaying third images on the at least one screen of the at least one display, each of the third images comprising at least one option of a second range of the each of the second images, and comprising an alternative image not including the each of the second images captured by the image capturing device but emulating at least one of the second images; and displaying fourth images on the at least one screen of the at least one display, each of the fourth images corresponding to a second part of the each of the second images, the second part of the each of the second images having the second range of the each of the second images, the second range being selected as the at least one option by a user.

2. The display method according to claim 1, wherein the alternative image is generated with a synthesized image.

3. The display method according to claim 1, wherein the alternative image is generated based on one of the second images.

4. The display method according to claim 1, wherein a third range of the alternative image of the each of the third images corresponds to the second part of the each of the second images.

5. The display method according to claim 1, wherein the at least one option includes at least two options indicating at least two ranges of the each of the second images.

6. The display method according to claim 1, wherein the image capturing device mounted on the vehicle, is configured to capture an interior of the vehicle, and the alternative image includes an image of a seat.

7. The display method according to claim 1, wherein the image capturing device mounted on the vehicle, is configured to capture an ambient view of the vehicle, and the alternative image includes at least one of:
    an image of another vehicle;
    an image of a pedestrian;
    an image of a road sign; or
    an image of a road marking.

8. A control circuit configured to display images on at least one display mounted on a vehicle, the control circuit comprising:

an input circuit configured to receive images captured by an image capturing device, and to receive a selection of a user;

an output circuit configured to be coupled with the at least one display, wherein the output circuit outputs first images to the at least one display, each of the first images corresponding to a first part of each of second images, the second images being captured by the image capturing device mounted on the vehicle, the first part of the each of the second images having a first range of the each of the second images, the output circuit outputs third images to the at least one display, each of the third images comprising at least one option of a second range of the each of the second images, and comprising an alternative image not including the each of the second images captured by the image capturing device but emulating at least one of the second images, and the output circuit outputs fourth images to the at least one display, each of the fourth images corresponding to a second part of the each of the second images, the second part of the each of the second images having the second range of the each of the second images, the second range being selected as the at least one option by the user.

9. The control circuit according to claim 8, wherein the alternative image is generated with a synthesized image.

10. The control circuit according to claim 8, wherein the alternative image is generated based on one of the second images.

11. The control circuit according to claim 8, wherein a third range of the alternative image of the each of the third images corresponds to the second part of the each of the second images.

12. The control circuit according to claim 8, wherein the at least one option includes at least two options indicating at least two ranges of the each of the second images.

13. The control circuit according to claim 8, wherein the image capturing device mounted on the vehicle, is configured to capture an interior of the vehicle, and the alternative image includes an image of a seat.

14. The control circuit according to claim 8, wherein the image capturing device mounted on the vehicle, is configured to capture an ambient view of the vehicle, and the alternative image includes at least one of:
    an image of another vehicle;
    an image of a pedestrian;
    an image of a road sign; or
    an image of a road marking.

* * * * *